United States Patent [19]
Bunker et al.

[11] Patent Number: 4,727,365
[45] Date of Patent: Feb. 23, 1988

[54] ADVANCED VIDEO OBJECT GENERATOR

[75] Inventors: William M. Bunker, Ormond Beach; Jimmy E. Chandler, Holly Hill; Richard Economy, Ormond Beach; Richard G. Fadden, Jr., Daytona Beach; Michael P. Nelson, Ormond Beach, all of Fla.

[73] Assignee: General Electric Company, Philadelphia, Pa.

[21] Appl. No.: 865,591

[22] Filed: May 21, 1986

Related U.S. Application Data

[63] Continuation of Ser. No. 527,809, Aug. 30, 1983, abandoned.

[51] Int. Cl.$^4$ .............................................. G09G 1/16
[52] U.S. Cl. ..................................... 340/728; 340/747; 340/723
[58] Field of Search ............... 340/723, 725, 728, 729, 340/730, 703, 747, 744

[56] References Cited

U.S. PATENT DOCUMENTS

| | | | |
|---|---|---|---|
| 3,441,789 | 4/1969 | Harrison, III | 340/729 X |
| 3,454,822 | 7/1969 | Harrison, III | 340/729 X |
| 3,527,980 | 9/1970 | Robichaud et al. | 340/725 X |
| 3,665,408 | 5/1972 | Erdahl et al. | 340/729 |
| 3,747,087 | 7/1973 | Harrison, III et al. | 340/725 X |
| 3,999,308 | 12/1976 | Peters | 35/12 |
| 4,053,740 | 10/1977 | Rosenthal | 340/729 X |
| 4,263,726 | 4/1981 | Bolton | 434/43 |
| 4,324,401 | 4/1982 | Stubben et al. | 340/725 X |
| 4,343,037 | 8/1982 | Bolton | 364/521 |
| 4,352,105 | 9/1982 | Harney | 340/747 X |
| 4,384,338 | 5/1983 | Bennett | 340/729 X |
| 4,471,349 | 9/1984 | Strolle | 340/727 |
| 4,475,104 | 10/1984 | Shen | 340/747 X |
| 4,532,503 | 7/1985 | Pennebaker | 340/728 |
| 4,570,233 | 2/1986 | Yan et al. | 340/747 X |
| 4,584,572 | 4/1986 | Lambert, III | 340/728 X |
| 4,586,037 | 4/1986 | Rosener et al. | 340/728 |
| 4,609,917 | 9/1986 | Shen | 340/747 X |
| 4,656,467 | 4/1987 | Strolle | 340/727 |

OTHER PUBLICATIONS

Artistry in Layers: Generating Color Transparencies; Denbrook Computer Design; Jul. 1982; pp. 155-163.

Graf, C. P., D. M. Baldwin; "Computer Generated/Synthesized Imagery (CGIS)"; vol. I, Proceedings of the Fourth Interservice/Industry Training Equipment Conference, Nov. 16-18, 1982; pp. 549-558.

Skolmoski, P. T.; "Texture in a Low Cost Visual System", vol. I, Proceedings of the Fourth Interservice/Industry Training Equipment Conference, Nov. 16-18, 1982; pp. 541-548.

Mayer, N. L., Cosman, M. A.; "Enhancing the Computer Generated Illusion"; vol. I, Proceedings of the Fourth Interservice/Industry Training Equipment Conference, Nov. 16-18, 1982; pp. 13-22.

Gardner, G. Y., Gelman, R.; "Simplified Scene Modeling Using Curved Surfaces and Texturing", vol. I, Proceedings of the Fourth Interservice/Industry Training Equipment Conference, Nov. 16-18, 1982; pp. 23-29.

Blinn, J. F.; "Light Reflection Functions for Simulation of Clouds and Dusty Surfaces"; vol. 16, No. 3, Computer Graphics, Jul. 1982; pp. 21-29.

Bunker, W. M., Ferris, N. E.; "Computer Image Generation Imagery Improvement: Circles, Contours, and Texture", Air Force Technical Report AFHRL-TR-77-66, Sep. 1977; pp. 117-129.

Primary Examiner—Marshall M. Curtis
Attorney, Agent, or Firm—Stephen A. Young; Paul Checkovich

[57] ABSTRACT

A computer video image generating system including a computer memory having three dimensional object data stored therein employs an advanced object generator for retrieving and processing the object data for output to a span processor for controlling the pixel-by-pixel video output signal for a video display. The advanced object generator includes a translucency processor, an edge-on fading processor, a level of detail blending processor and a bilinear interpolator for texture smoothing.

33 Claims, 22 Drawing Figures

ADVANCED VIDEO OBJECT GENERATOR

This application is a continuation of application Ser. No. 527,809, filed Aug. 30, 1983, now abandoned.

BACKGROUND OF THE INVENTION

1. Field of the Invention

This invention relates to computer image generator (CIG) systems, and, more particularly, to an improved video object generator for use in real-time imaging systems.

2. Description of the Prior Art

Simulators are being specified for a variety of training tasks other than the traditional tasks such as takeoff and landing, and air-to-ground weapons delivery. For some of these new tasks current levels of scene realism will not suffice. For example, a requirement of nap of the earth helicopter pilot training is that the pilot start at some distance from a tree or other obstacle, that he fly to a point one meter from the tree as measured by the distance from the tip of his rotor blades to the tree, and that he maintain that position. A realistic image of the tree must be produced for the pilot to effectively train for a flight requirement of this type. Prior art systems were unable to generate an adequately detailed image in real time for such applications.

One prior art system is disclosed in U.S. Pat. No. 4,343,037, issued Aug. 3, 1982 to Bolton and assigned to Redifon Simulation Limited. In this patent disclosure, columns 13-21, a texture pattern is stored in memory and retrieved for each pixel along each scan line. As stated in the patent, memory size and access time limitations limit the detail which can be handled by the system.

In depicting images of very complex objects, such as trees, the number of edges and texture patterns required to generate a realistic image would be prohibitively large for a real-time system.

SUMMARY OF THE INVENTION

An object of the present invention is to provide a computer image generation system capable of generating complex objects in real-time for display on video displays.

Another object of the present invention is to provide a CIG system for generating realistic images of three dimensional objects for real-time video display.

A more specific object of the present invention is the application of cell texturing, level of detail blending, translucency modulation, bilinear interpolation smoothing and edge-on fading to real-time CIG systems.

Accordingly, the advanced video object generator of the present invention includes a memory for storing data applicable to each cell of a surface defining texture patterns or actual objects, translucency code calculation boards, memory for storing a transparency or translucency code and supplying this code on a pixel-by-pixel basis to the image generator, level of detail calculators and level of detail blending, edge-on fading, and texture smoothing for generating images of three dimensional objects for computer image generation.

BRIEF DESCRIPTION OF THE DRAWINGS

The features of the invention believed to be novel and unobvious over the prior art are set forth with particularity in the appended claims. The invention itself, however, as to organization, method of operation, and best mode contemplated by the inventor, together with further objects and advantages, may best be understood by reference to the following description taken in conjunction with the accompanying drawings, in which like reference characters refer to like elements throughout, and in which:

DESCRIPTION OF THE PREFERRED EMBODIMENTS

The present invention employs cell texture as one concept for the generation of images by computer image generation. Any point on a defined surface in 3-dimensional space can be specified by the values of two parameters. On a planar surface these parameters might be labeled x and y. Points on a cylindrical surface might be designated by values of z and $\theta$, and points on a sphere or ellipsoid can be defined by $\theta$ and $\phi$. In the present specification we will use $Q_1$ and $Q_2$ as generic parameter designations.

Figure 1:
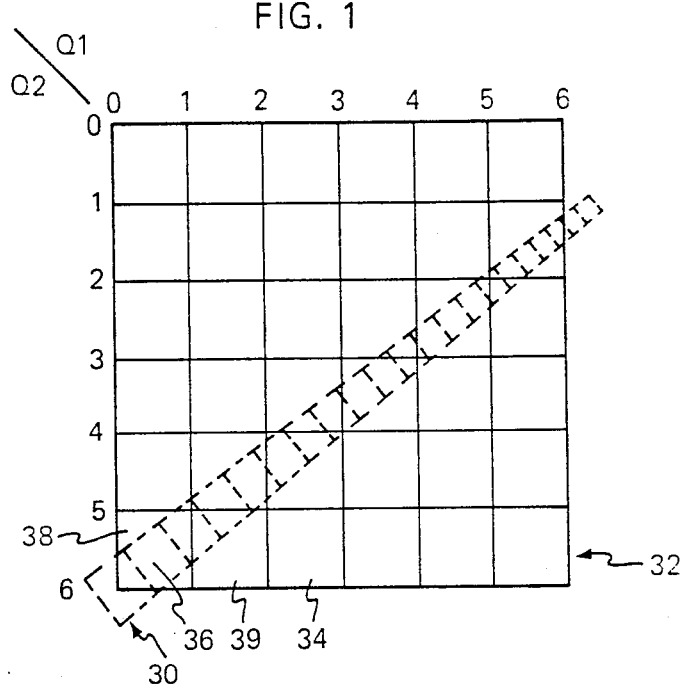
FIG. 1 is a schematic diagram illustrating the mapping of a scan line of pixels onto a cell-textured face.

FIG. 1 is a view of a planar surface with values of $Q_1$ and $Q_2$ shown. Base color or modulation information can be considered as functions of $Q_1$ and $Q_2$. The functional relationship may involve quantitative processing of the values of $Q_1$ and $Q_2$, it may involve using $Q_1$ and $Q_2$ either separately or concatenated as addresses to a table-look-up memory, or it may involve a combination of these techniques. In the simplest form of operation, assume the integral portions of values of $Q_1$ and $Q_2$ are combined and used as an address for elements of the diagram. This will provide a distinct address for each of the small squares in FIG. 1, referred to hereinafter as cells.

FIG. 1 also shows the images of a group of pixels on a scan line 30 projected onto the face 32 containing the cells 34. In one mode of operation of cell texture, the values of $Q_1$ and $Q_2$ corresponding to the center of each pixel are determined, the modulation or color information designated by this $Q_1$-$Q_2$ combination is extracted from a computer memory previously loaded with the modulation or color information for each face of a set of objects to be shown on a video display, and these values are used to determine or modify the pixel video. The memory contents can be determined by some algorithm applied to the $Q_1$-$Q_2$ values on the image of an object to be loaded into memory, by digitizing photographs of features of regions to be represented, or by some combination of these techniques. The results of these image describing techniques are then stored in memory for retrieval and use in computer image generation. The treatment of object images in this way for computer image generation, CIG, is called cell texturing.

The mathematics to determine the strike-point of a view ray on a parametrically defined curved surface is sufficiently complex that large amounts of hardware are required to apply cell texture to such surfaces in real-time systems. For planar surfaces the values of Q expressed in terms of view window location I, J is in the form:

$$Q = P_o + \frac{C1 + C2\Delta I + C3\Delta J}{C4 + C5\Delta I + C6\Delta J} \qquad \text{Equation 1}$$

in which $P_o$ and $C_1$-$C_6$ are supplied from the vector processor, which generates the values of the coefficients for mapping video information from cells onto pixels on the scene to be displayed. $P_o$ is the reference value which, in combination with $C_1$-$C_6$, determines the location on a face struck by a ray through pixel I, J. There is a separate set of $P_o$ and $C_1$-$C_3$ for each parameter, i.e., two sets for cell texture—one for Q1 and the other for Q2. $C_4$-$C_6$ are the same for both.

The numerator and denominator of the quotient in Equation 1 are each linear in I and J and hence easily updated by incrementing. This still leaves the rather formidable task of obtaining the high precision quotient for each pixel or subpixel.

Successful work with cell texture has been done with parameters carefully adjusted so both pixels and texture cells are small relative to the resolution of the eye, with on the order or two or three pixels per cell. When a cell textured object on a video image recedes from the viewer, the cells decrease in size relative to the pixels. When the two entities are comparable in size, moiré effects result, which are particularly distracting in scenes which change dynamically. If the cell textured face changes in orientation to become edge-on to the viewer, the cells decrease in size in one dimension leading to moiré effects. If, in addition, a set of cell textured planar faces is being used to simulate a feature with a shape other than that spatially defined by the faces, distortion of the desired image can result as the face approaches an edge-on configuration. The present invention provides means for overcoming these difficulties of cell textured image generation.

In many applications, such as the simulation of trees, it is desired that the boundary of a textured surface in a computer generated image be highly irregular, and even have regions interior to the boundary of a surface where one can see through the feature represented by the textured surface. While theoretically this could be achieved by defining the boundary and interior holes with edges, it would require so large a number of edges that processing for computer image generation is impractical for real-time systems. The present invention provides practical apparatus capable of handling, in a real-time computer image generation system, a realistic image of a feature having a very irregular boundary and having holes interior to the feature boundary.

Some applications of cell texture involve tiling a large area with repetitions of one or a small number of individual tile patterns. In order to provide a realistic image it is essential that there be no perceived indication of this tiling. Therefore, a technique is required to eliminate any indication of the tile boundaries in the scene. The present invention uses a tile blending technique for illustrating large areas without producing visible tile boundaries in the video image.

To illustrate the technique of the present invention a computer generated image of a tree will be employed, because it is felt that generation of realistic trees represents a high level of image complexity, and the capability of producing realistic trees is essential for training applications in which operation of aircraft, such as helicopters, in close proximity to objects, such as trees, is required.

Figure 2:
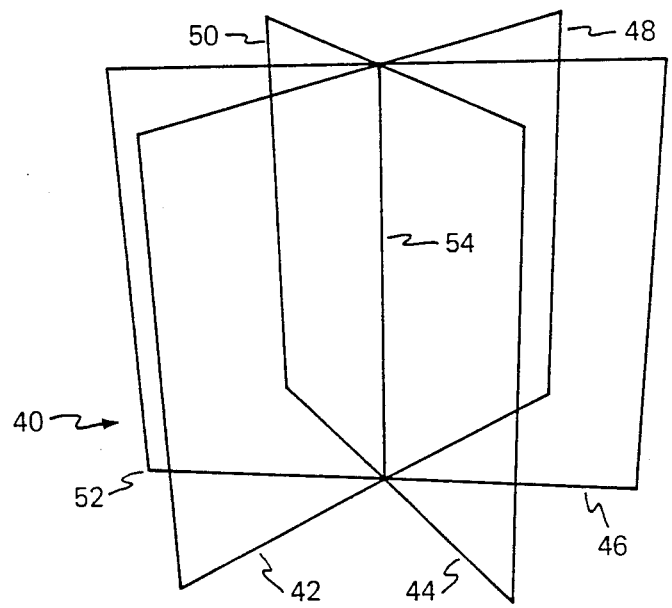
FIG. 2 is a schematic diagram illustrating the orientation of a set of planes upon which an image of a three-dimensional object is projected for use in computer generation of the object for video display by the object generator of the present invention.

One form of imaging model 40 used to generate images of three dimensional objects consists of a set of faces 42, 44, 46, 48, 50 and 52 radiating like fins from a common axis 54 as shown in FIG. 2. This arrangement gives the appearance from all horizontal directions of having a face close to perpendicular to the viewray, which is the line from the observer's eye to the object being displayed. The tree image is stored as texture cells projected onto the six faces as shown in FIG. 2, and retrieved or displayed to the viewer as required by the image generator in response to inputs from the viewer controls. The storing of the image data in this manner, and the calculation of coordinates for user orientation are performed by hardware outside the advanced object generator of the present invention.

Figure 17:
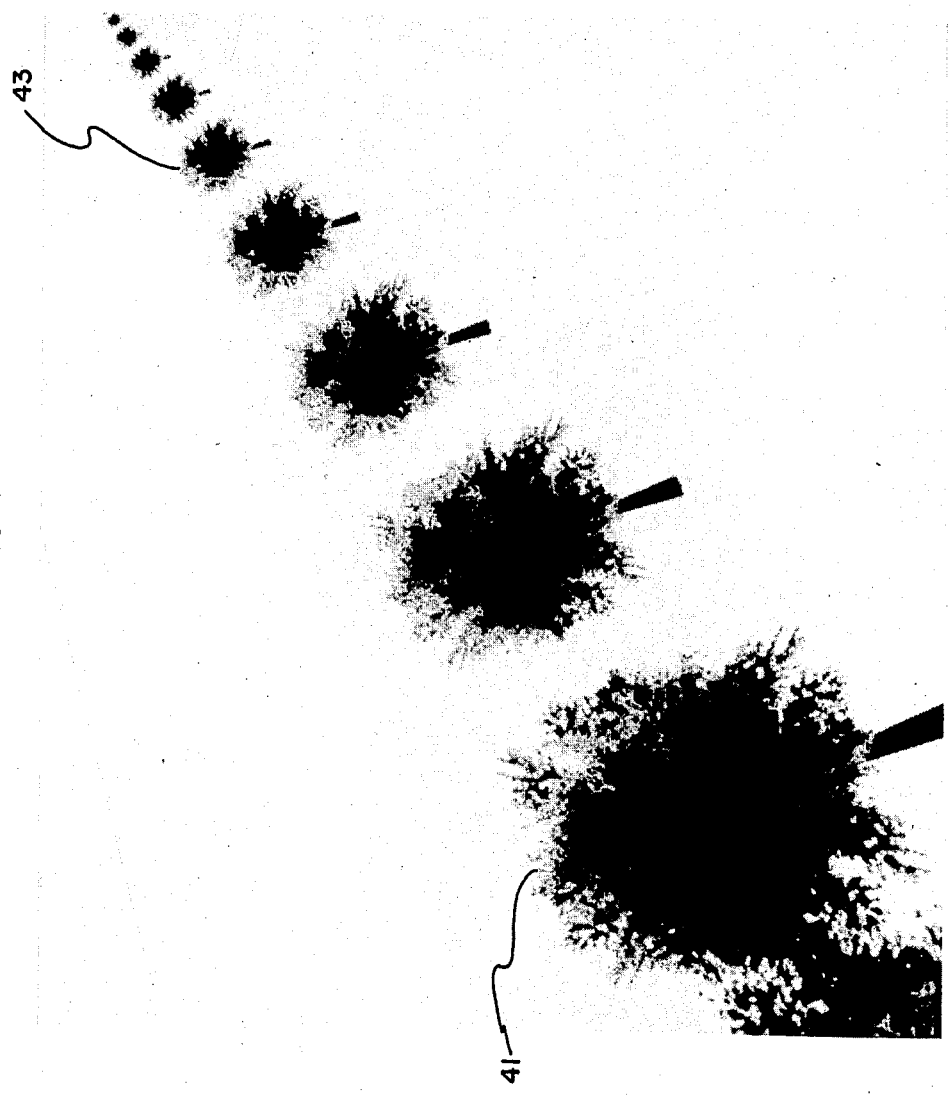
FIGS. 17-20 are photographs showing the image effects of the present invention.

One significant modification of cell texture that led to the present invention was the concept of a transparency code. One word from the cell memory, for example, all zeros, is interpreted not in a quantitative manner, but as designating that cell as transparent. This makes it possible for the outline of a feature to differ from the outline of the face on which cell texture defines the feature, since the cells around the boundary of the face can be coded as transparent. It also makes it possible to have open regions inside the face boundary, for example, inside the boundary of a tree, and, if a vehicle or other object lies on the face behind the tree, it will be seen through these holes. This capability can be used to illustrate features with extremely irregular boundaries such as trees, or to illustrate features having essentially rectangular faces, such as a vehicle, by coding the portion of the face outside the boundary of the vehicle as transparent. The tree images shown in the photograph of FIG. 17 show the effect of the use of a transparency code.

VARIABLE TRANSLUCENCE

Another key element of the present invention is the concept of variable translucence. Consider a cell near the boundary of a tree which is half covered by a tree leaf, and half covered by the sky. Straight digitization of this cell will designate this cell as very light green. This will be acceptable when the cell is seen as against the sky, but as the viewer moves it may be that the leaf will be seen against another tree or against the ground. Then, unless a color change occurs, the tree will have an unnatural light halo. With the concept of translucency the tree leaf cell is designated standard tree green, with 50% translucency, i.e., only half the color content of the cell will be the green of the tree. When seen against the sky the cell will be a very light blue green called for at the boundary, since half the color of the cell will be sky blue. When seen against the ground, the cell will be a dark brownish-green representing the combination of the standard tree green with 50% translucency and the background earth color. Variable translucency also allows the depiction of other visual effects, such as smoke which can range from opaque to barely visible.

EDGE-ON FADING

Figure 18:

As described above, when viewing faces as they approach edge-on orientation, distracting and unrealistic effects are produced by unrefined cell texture techniques. The present invention provides a technique for overcoming this problem by adding edge-on fading to the image processing. As the angle between a plane of the face as shown in FIG. 2 and the viewray decreases, the entire face is gradually processed as translucent. The saturation decreases with angle until at some final angle the face is completely transparent and is no longer processed. In a dynamic test sequence it was determined that by starting the fading at a viewing angle of 36° and eliminating the face at 18° a realistic image with no artifacts of the edge-on fading is produced. Other angles are also useable so long as the fading is done in such a way that the user perceives no artifacts. This provides for a gradual elimination of the face from the image as it approaches edge-on orientation, so that the distracting and unrealistic effects of viewing the image at the edge-on orientation are eliminated. FIGS. 17 and 18 illustrate the image effect of edge-on fading. In FIG. 17 no edge-on plane appears but in FIG. 18 the planes 49 appear clearly. These faces 49 detract significantly from the realism of the tree image.

LEVEL OF DETAIL

Another key feature of the present invention is level of detail processing. When the distance to a cell textured face is such that a cell is approximately equal to a pixel in size, scintillation and moiré effects may result. The present invention overcomes this problem by controlling the size of cells relative to pixel size in each linear dimension. One particular embodiment of the present invention provides a set of nine levels of detail (LODs) which range from the highest level of detail (LOD 0) containing 256×256 cells, with the linear dimension of each cell as 0.125 ft. and the lowest level of detail (LOD 9) being a single value for the map. Table 1 shows a typical set of levels of detail and their respective cell sizes as used in one particular example of the present invention; these are exemplary only and the cell sizes can be selected by the user to any desired dimension.

TABLE 1

LOD 0 = 256 × 256 cells, each 0.125 feet per cell
LOD 1 = 128 × 128 cells, each 0.250 feet per cell
LOD 2 = 64 × 64 cells, each 0.500 feet per cell TABLE 1-continued LOD 3 = 32 × 32 cells, each 1.000 feet per cell
LOD 4 = 16 × 16 cells, each 2.000 feet per cell
LOD 5 = 8 × 8 cells, each 4.000 feet per cell
LOD 6 = 4 × 4 cells, each 8.000 feet per cell
LOD 7 = 2 × 2 cells, each 16.000 feet per cell
LOD 8 = 1 × 1 cells, each 32.000 feet per cell
LOD 9 = invisible (too far away)

LOD 8 with cells 32 ft. square may seem of such size as to be meaningless, but this LOD is used for imaging faces of objects shown at distances from the viewer such that a cell encloses only one or two pixels, and a face contains only a few cells, and greater detail at that distance could not be seen even if it were defined by the image generator.

Transitions from one LOD to another are made at a distance from the viewer such that they would be barely discernible. However, the nature of the human perception system is such that even very slight differences are noticeable if they occur abruptly. The present invention overcomes this difficulty by using LOD blending, which is a gradual transition from one LOD to the next. The computation to select the LOD to be used for any span on a display gives a whole number term and a fractional term. The fractional term is referred to as the alpha term. It designates the portions of each of two adjacent levels of detail to be used in the blending process; hence, this process is referred to as LOD alpha blending.

The effect of using this LOD transition technique is illustrated in the photograph in FIG. 17. The sequence shows trees at increasing distances, and hence covers a number of LODs with a variety of alpha values. Yet, as will be recognized, the desired effect of LOD alpha blending, i.e., gradual change in the image detail shown, is well illustrated. The tree 41 is shown with substantially more detail than tree 43, but the point of LOD transistion is not discernible. This same realism is also present in dynamic sequences with no hint of scintillation or LOD transition.

CELL SMOOTHING

Figure 19:
Figure 20:

At the boundaries of image cells some smoothing technique must be used to minimize the appearance of the edge of the cell within the image of the object shown. Consider a pixel somewhat smaller than a cell, e.g., pixel 36 as shown in FIG. 1. As pixel 36 moves across a given cell, e.g., cell 38, the pixel is given the intensity of that cell. As pixel 36 crosses the boundary to the next cell 39, it changes to the intensity of that next cell 39, and retains that intensity as it moves across the cell. Texture cell smoothing in the present invention provides a gradual transition as described below. Assume a pixel with its center coincident with the center of a cell. The pixel will be given the intensity of that cell. If the pixel starts moving parallel with a line of cells to the right toward an adjacent cell, it is given an intensity which is a combination of the two cells, even when the pixel is entirely contained within the first cell. The intensity will be changed gradually as the pixel approaches the cell boundary, and when the pixel reaches the center of the second cell it will have that cell's intensity. In a two-dimensional case, this is accomplished by bilinear interpolation. The four cells whose centers define a polygon containing the center of a pixel are identified. The pixel intensity is computed from the four-cell intensity values with a weighting based on the location of the pixel center relative to the cell centers. This technique eliminates the problem of texture cell boundaries causing distracting artifacts from the image projected dynamically. The effect is shown in FIGS. 19 and 20. In FIG. 19 using area times color processing, the cells 45 of the image are quite readily visible. In FIG. 20 using bilinear interpolation even at a very close approach as shown at 47, the cells can not be seen.

TILE BLENDING

When a rectangular cell map of limited size is replicated to cover an extended surface, in either one or two dimensions, the process is referred to as "tiling". Thus the right boundary of the map will abut a copy of the left boundary, and the bottom boundary will abut a copy of the top boundary. Interior to the map the cells represent samples of a continuum, so cell-to-cell contrast is low and there is very limited high spatial frequency content. When the boundaries abut as described above there will in general be regions of high contrast and high spatial frequency content. The boundaries will be obvious on the tiled surface, giving an artificial appearance.

This problem is solved by adjusting the cell map contents to provide filtering at the boundaries. As an example, the rightmost cell of each cell-row might be given a value equal to 55% of its original value plus 45% of the value of the leftmost cell. The second cell from the right will be changed to 65% of its original value plus 35% of the value of the second cell from the left. Continuing, the fifth cell from the right boundary will have 95% of its original value plus 5% of the value of the fifth cell from the left, and cells to the left of this will retain their original values. The same gradation is, of course, applied to a group of cells along the left boundary. The result is a blending effect which makes the boundaries indistinguishable from other portions of the image on the resulting display. If tiling is to be applied in two dimensions, similar blending is applied to the top and bottom boundaries. The actual size of the group of cells over which blending is applied is adjusted to give best results for the specific contents of each map. In cases where there are extensive differences between two abutting boundaries of a pattern, the interactive manual intervention capability may be used to achieve best results.

HARDWARE BLOCK DIAGRAM

Figure 3A:
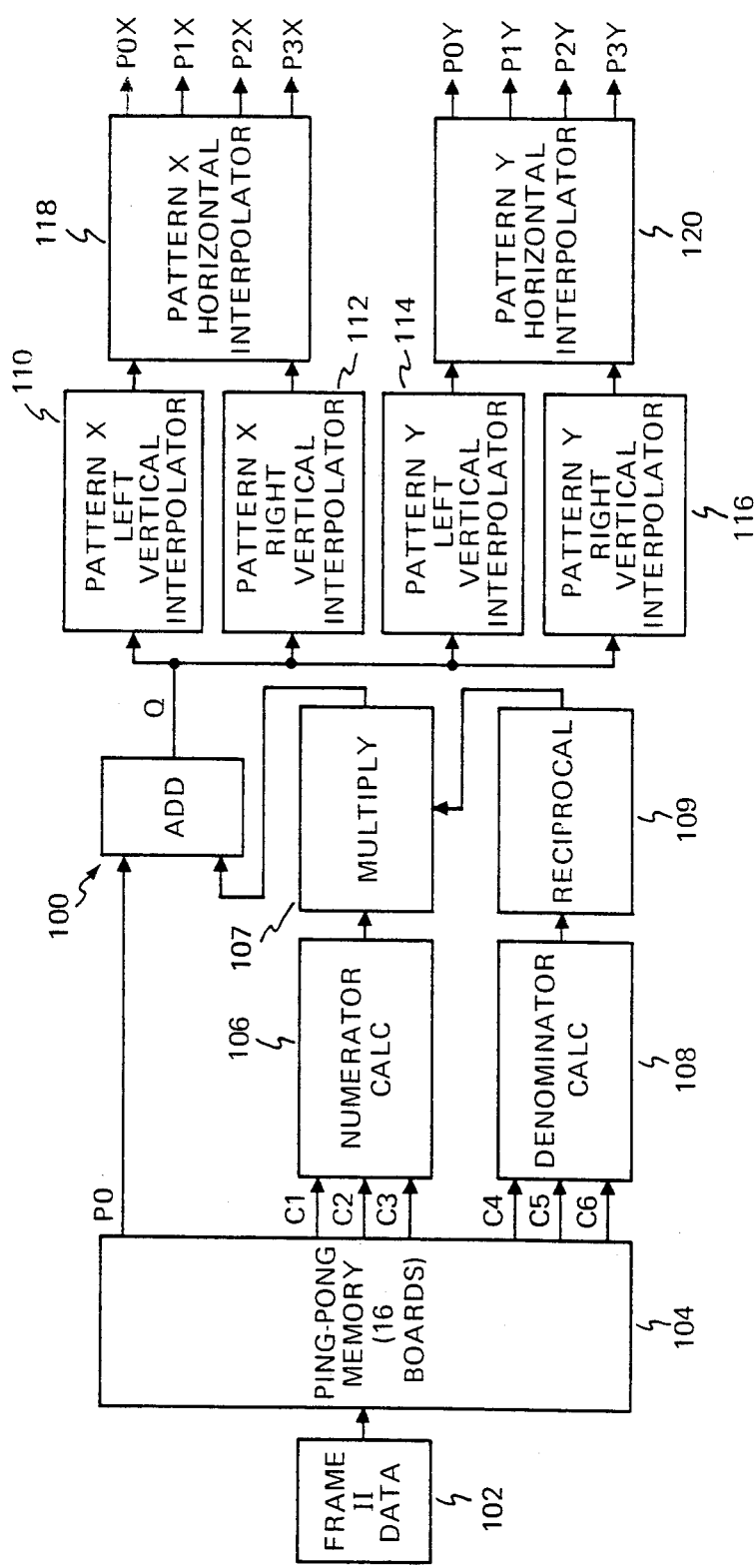
FIGS. 3A and 3B are a functional block diagram illustrating the functions performed by the advanced object generator of the present invention.
Figure 3B:
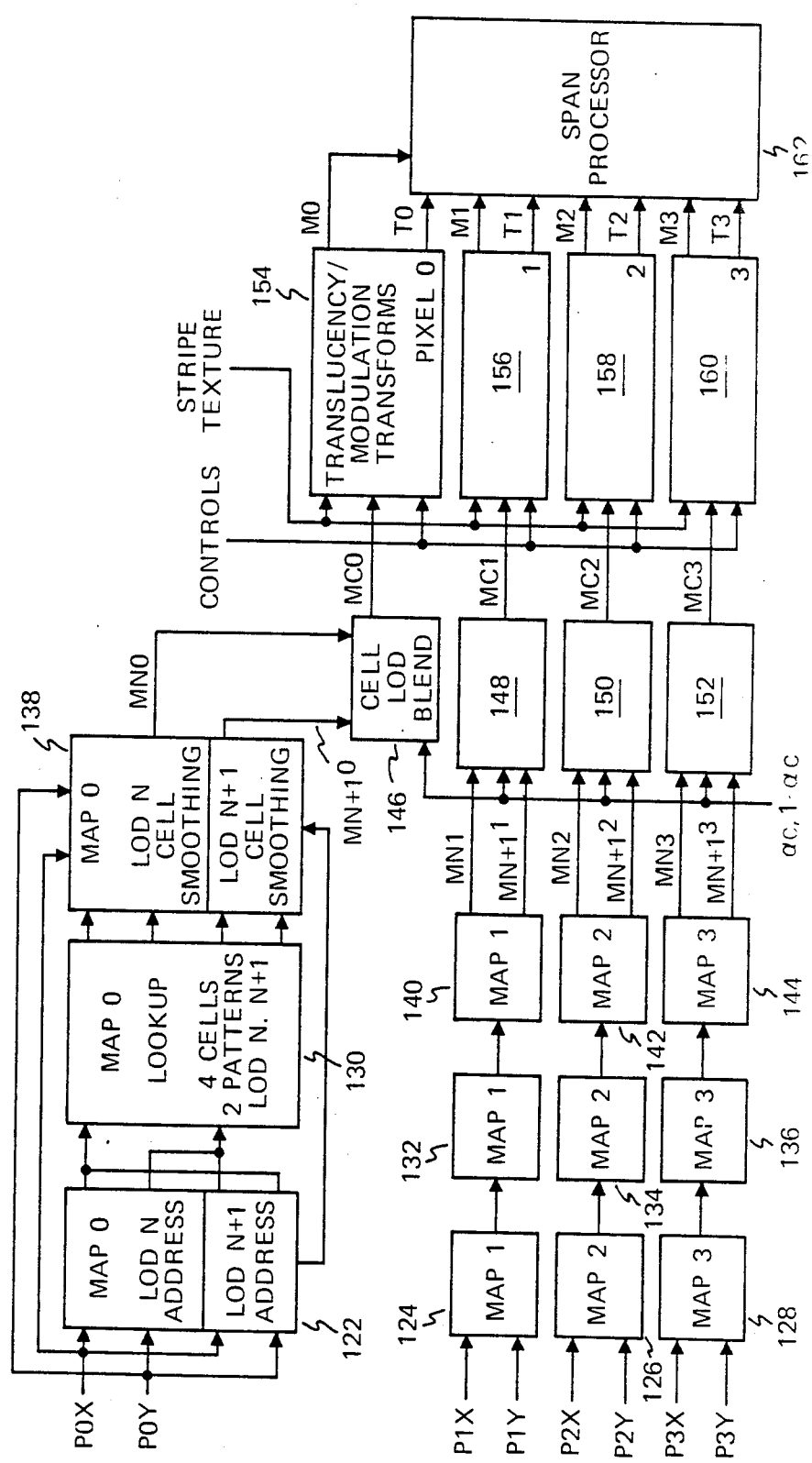

A block diagram of the advanced video object generator 100 of the present invention is shown in FIG. 3. Image data are input from vector processor 102, and operator inputs are provided from the user controls (not shown). The image data contain color and texture information for each object face in the scene to be displayed. The input data is received in input memories 104 for feeding to the advanced object generator. The memories 104 are double buffered (or ping-ponged) in the digital data base, so that the current field's worth of data may be read out, while the next field's data is being loaded into memories 104. The input memories 104 are made with sufficient depth (i.e., 4K) to hold all face data which may appear in one channel in a given field. The conventional vector calculations which transform the pattern coefficients of the faces in a scene to the correct 3D perspective for the observer's viewpoint are performed by the vector processor and supplied to the advanced object generator. The viewpoint and operator control inputs are used to determine which object images are to be processed for display upon a particular video display. The present invention processes the image data for those objects determined to be visible.

The boards 106–109 calculate the Q value defined by Equation 1. After the Q values for each span corner of each span of a video scene are calculated, a bilinear interpolation is used to determine Q values for each individual pixel. The bilinear interpolation is performed by the combination of vertical interpolators 110, 112, 114 and 116 and horizontal interpolators 118 and 120. The outputs from the horizontal interpolators are input to the cell map address boards 122, 124, 126 and 128, which calculate map addresses for accessing the cell texture maps 130, 132, 134 and 136. The cell texture maps contain cell texture data for each cell of the image. The X and Y Q values are combined to form the map address for each of the four cells whose centers form a polygon surrounding the pixel center. The cell map shape can be selected to be 1,024×64 cells, 512×128 cells or 256×256 cells with face control flags. Each map shape requires 64K memory data storage. Four copies of the map are required to perform cell smoothing. The map LODS are used to control the map cell size relative to the display pixel size regardless of the viewray distance to the scene feature. Each different LOD map copy is mathematically generated by filtering the more detailed copy into a ¼ smaller map. Thus, a 256×256 map will become 128×128 and then a 64×64, etc. size map as view distance to the feature increases.

A total of 86K memory locations are required in the LOD cell memories 130, 132, 134 and 136 to store all the different LOD versions of the maps. The map storage is arranged so that the N and N+1 LOD map versions are available simultaneously to accomplish a smooth LOD transition between the two levels. The determination of which LOD to use is made by monitoring both the X and Y pattern gradients in the view plane. This is controlled by floating point subtraction hardware in the base number calculators 106–109. The worst case pattern change floating point exponent selects which N and N+1 map LODs to use.

The outputs from the cell memories 130, 132, 134 and 136 are supplied to the cell smoothing boards 138, 140, 142, 144. The cell smoothing boards also receive inputs from the horizontal interpolators which are used to calculate the proportion of intensity input from the four cells surrounding a given pixel. This calculation provides a coefficient for each of the cell intensities for controlling the pixel intensity.

The four adjacent cells surrounding a view pixel are read from memory and blended in cell smoothing boards 138, 140, 142 and 144 according to the equation as follows:

$$M = Mxy *(1 - f(x))*(1 - f(Y)) +$$
$$Mxyl *(1 - f(x))*(f(y)) + Mxly *(f(x))*(1 - f(y)) +$$
$$Mxlyl *(f(x))*(f(y))$$

Equation 2 where Mxy, Mxyl, Mxly, and Mxlyl are the cell memory contents for the four cells surrounding the view panel. Each of the f numbers refers to the fractional bits of the Q number which remain after the LOD addressing shift. These bits are a direct indication of the distances of the center of a view pixel to the centers of the four surrounding cells. Logic is included in the blending hardware to control the cell smoothing at each of the four edges of the cell map. Each of the LOD N and LOD N+1 maps must be blended with separate hardware. After the cell smoothing, the two different LOD modulations are blended together. This LOD blending is performed in boards 146, 148, 150, 152. Fractional gradient bits are used to form an alpha LOD blend coefficient to combine the two LOD map versions as follows:

$$M = \alpha*M(N+1) + (1-\alpha)*M(N) \quad \text{Equation 3}$$

At this point, the cell texture calculations have been completed. The cell texture value is now transformed to control face translucency as well as to modulate the face color by the translucency/modulation boards 154, 156, 158, 160. The outputs from the translucency/modulation boards are fed to the span processor 162 to control the image being generated.

Figure 4:
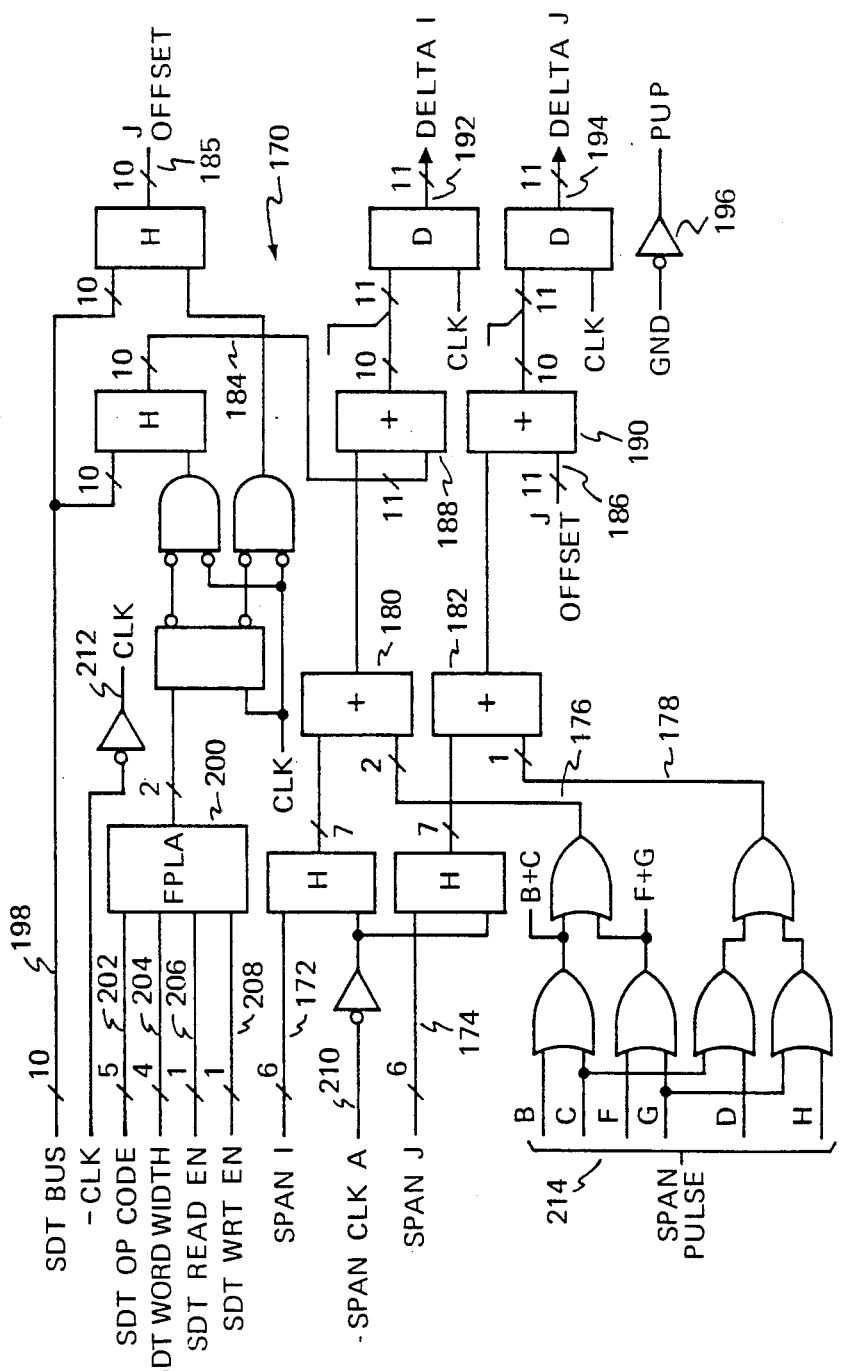
FIGS. 4, 5, 6 and 7 are schematic block diagrams illustrating the boards for calculating pixel coordinates relative to the cell textured faces.

The individual boards of a preferred embodiment of the advanced video object generator will now be described in detail. It should be understood that the bit counts shown on the Figures and described hereinafter are selected for convenience and are not intended to be limiting. As shown in FIG. 4 the I, J calculator board 170 receives span I 172 and span J 174 address data from the span processor. "Span I" and "Span J" are added to "increment I" 176 and "increment J" 178, respectively, by adders 180, 182 in order to compute the span address at the four corners of the span. The resulting values are added to "I offset" 184 and "J offset" 186, respectively, by adders 188, 190 in order to produce "ΔI" 192 and "ΔJ" 194 which are used in the computation of the Q value. In order to move to the center of a pixel, 0.5 must be added to "ΔI" and "ΔJ". Hence a pullup 196 is used for the LSB. The I, J calculator board 170 receives standard data terminal bus input 198 which is the test bus used with the system. The FPLA register 200 receives standard data terminal code input 202 to interface the user board to the standard data terminal (SDT) word 204 to select one of sixteen test words, a SDT read enable input 206 which is a control line coming from the SDT to indicate that the current test cycle is a read cycle, and a SDT write enable input 208 which is a control line coming from the SDT to indicate that the current test cycle is a write cycle. The "span I" input 172 provides the span I address from the span processor, and the span J input 174 provides the span J address from the span processor. A span clock input 210 provides a clock signal in synchronism with the span processor. The clock input 212 is provided from the system reference clock. The span pulse inputs 214 are "enable" signals that are active high during the total duration of the clock cycle to activate the board for processing a particular span's data. It takes eight clock cycles to compute each span in the span processor. The cell texture base number calculator requires four clock cycles to compute the Q value at the four corners of a span for pattern X, and four additional clock cycles to compute the Q value at the four corners of the span for pattern Y. The block diagrams show the sequence used in computing the eight Q values. The cell texture pattern values are calculated at each increment of the span in each eight clock cycle time.

Figure 5:
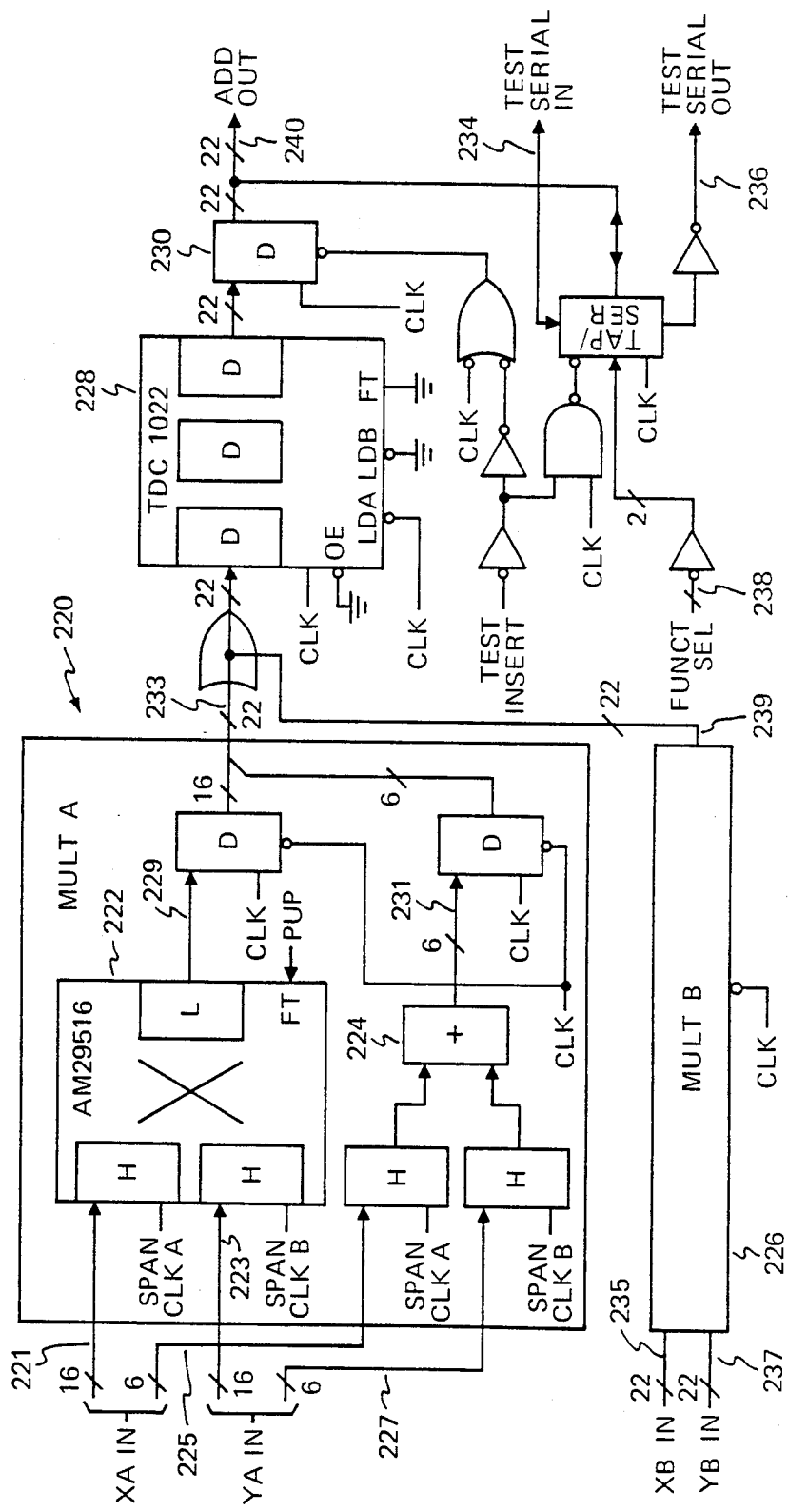

The floating point dual multiplier and summer 220 shown in FIG. 5 is used to multiply two pairs of 22-bit floating point numbers, representing the face coefficients from the input memories by the delta I and delta J outputs from the I, J calculator board 170. The two results 233, 239 are added to produce a 22-bit floating point number 240. Thus, the arithmetic operation being implemented on this board is Equation 4 as follows:

$$\text{ADD OUT} = (Xa * Ya) + (Xb * Yb) \quad \text{Equation 4}$$

where all the variables are 22-bit floating point numbers. The multiplier includes a 16-bit multiplier chip 222 that operates on the significand 221, 223 of the input variables. The exponents 225, 227 are added using the adder 224. A second multiplier 226 is used to multiply the significand of the input variables Xb 235 and Yb 237, and a second adder adds the exponents of Xb and Yb. The outputs 233, 239 from the multiplier and adders are input to the floating point ALU chip 228 used as a floating point adder. The output of the floating point adder 228 is supplied to a delay register 230 to be supplied as output 240 to the floating point dual summer and multiplier 232, FIG. 6. The floating point dual multiplier and summer receives span clock inputs to provide timing signals in synchronism with the span processor, and reference clock inputs to control the operation of the multiplier and summer to be in synchronism with the reference clock. The TEST IN 234 and TEST OUT 236 signals along with the FUNCTION SELECT input 238 test insert signals are testing inputs and outputs to allow board testing during operation of the system, but have no direct effect upon the system operation.

Figure 6:
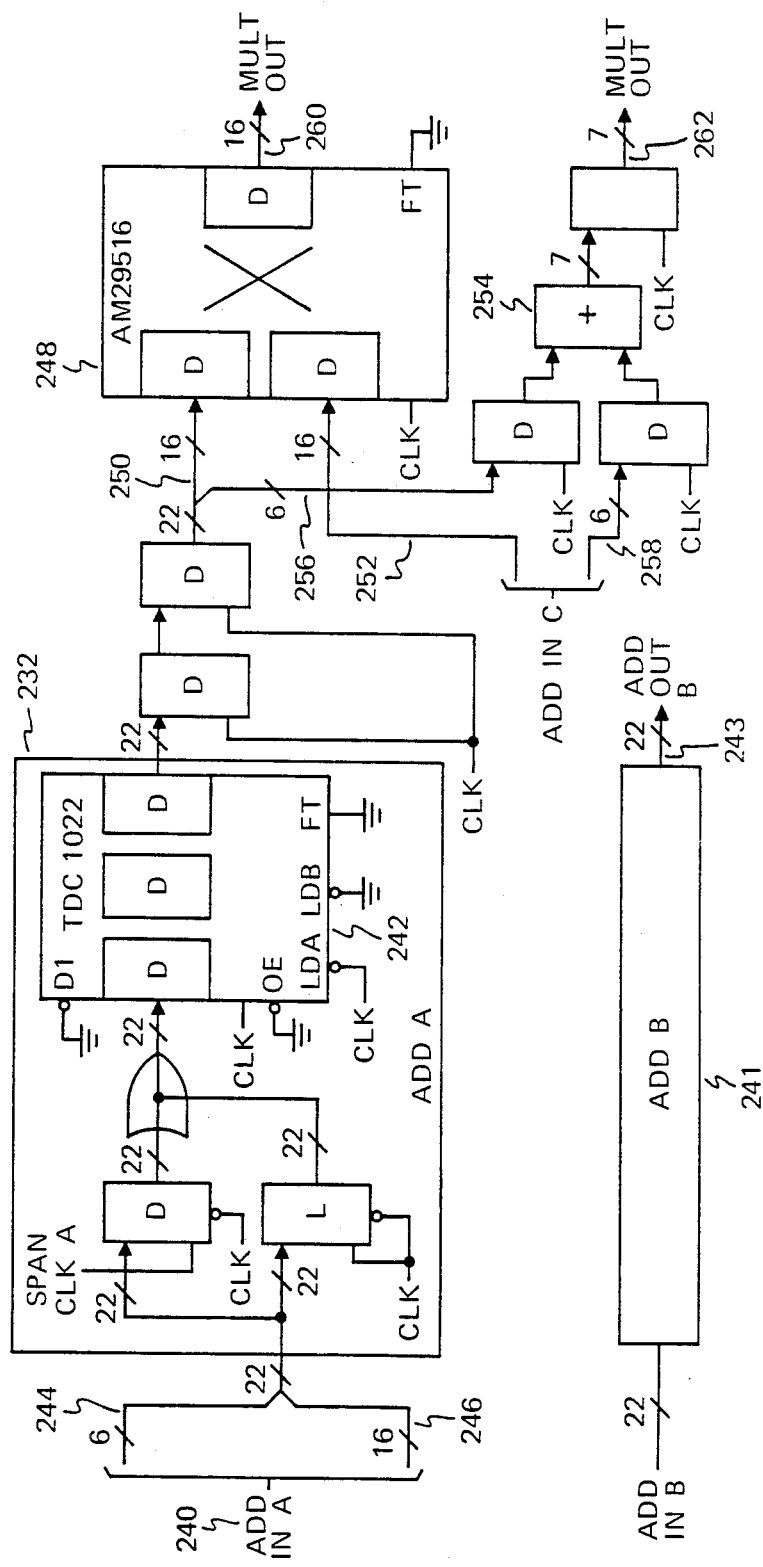

The output 240 from the floating point dual multiplier and summer 220 is supplied to the floating point dual summer and multiplier 232, as shown in FIG. 6, as exponent 244 and significand 246 inputs. Adder 242 adds the texture face start coefficients with the delta I and delta J adjusted texture face coefficients to produce a 22-bit floating point number. The A floating point adder 232 is used for the numerator calculation of Equation 1. The B floating point adder 241 is used for the denominator calculation of Equation 1 and the output 243 is routed off board to the reciprocal look-up table before being brought back to the C add input 252, 258. The multiplier 248 multiplies the 16-bit significand inputs 250, 252 and adder 254 sums the 6-bit significand inputs 250, 252 and adder 254 sums the 6-bit exponents inputs 256, 258 to yield Q of Equation 1 as a 23-bit output, which includes a 16-bit significand 260 and a 7-bit exponent 262.

Figure 7:
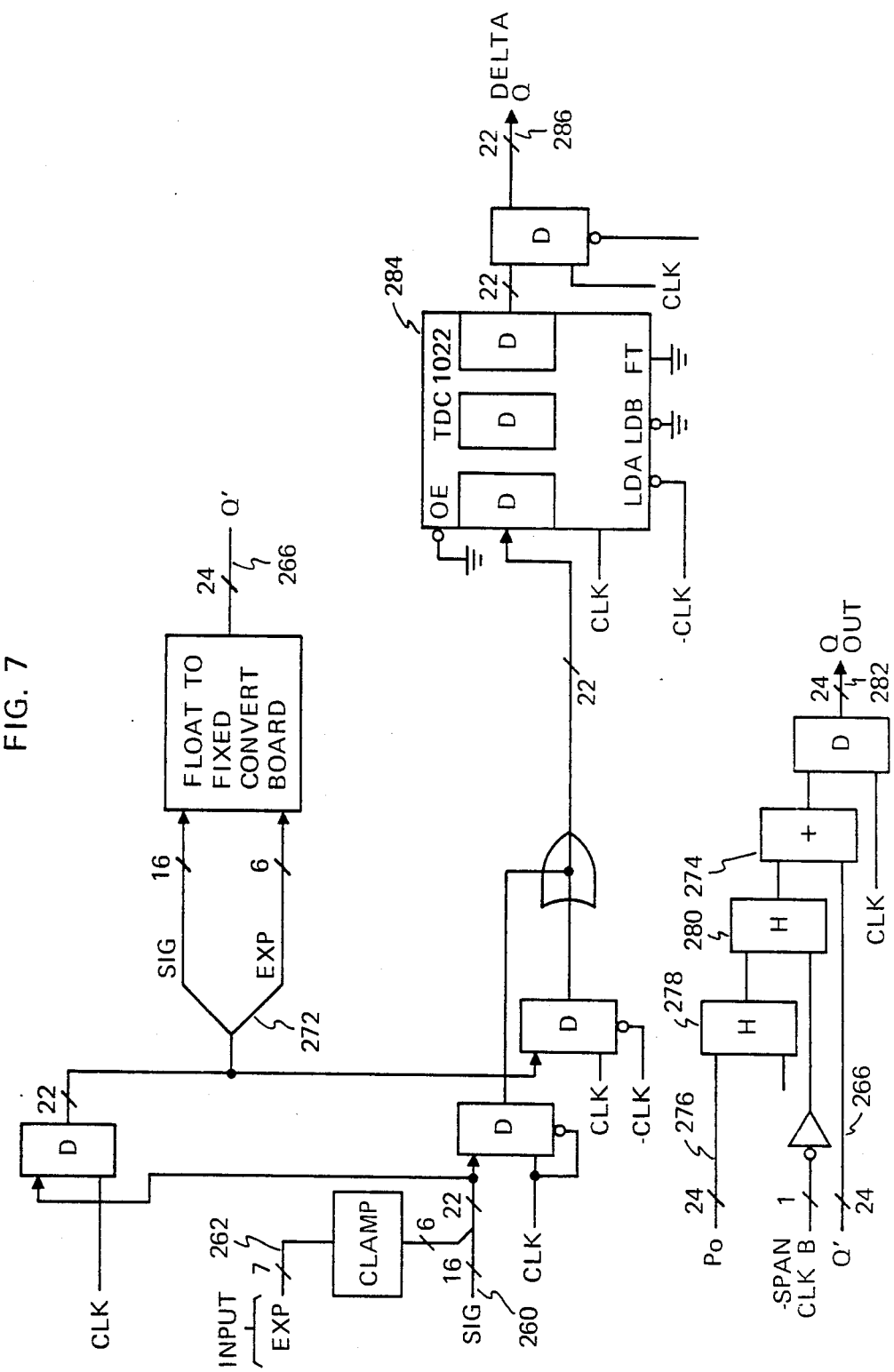

The float-to-fixed calculator as shown in FIG. 7 converts the floating point Q value 260, 262 provided from the floating point summer and multiplier to a 24-bit fixed point number Q' 266. The floating point Q is connected to the Po summer hardware 274, which adds Po input 276 from the input memory to the Q' number 266. In order to meet the pipeline timing requirements, the Po value is delayed through two holding registers 278, 280, where each holding register is equivalent to four clock delays, so output 282 is in sync with the span processor. The chip 284 stores the value of Q from the previous cycle and subtracts the present Q value from the previous Q value to generate a ΔQ value to be output at 286 for each 8 clock period cycle. This board also contains input memory/output enable logic. This logic is divided into five sections. The C2 and C3 memories are enabled during clock cycles 2, 3, 4 and 5 for the X pattern, and during clock cycles 6, 7, 0 and 1 for the Y pattern. The Po memories are enabled during clock cycles 3, 4, 5 and 6 for the X pattern and during clock cycles 7, 0, 1 and 2 for the Y pattern. The C1 memories are enabled during clock cycle 0, 1, 2 and 3 for the X pattern and during clock cycles 4, 5, 6 and 7 for the Y pattern. The C4, C5 and C6 memories are enabled during all clock cycles. The C1 memory is tristated with the output of the floating point dual multiplier and summer which generates the numerator of Equation 2, and the C4 memory is tristated with the output of the floating point dual multiplier and summer for generating the denominator of Equation 2. Therefore, the respective output enables are only active during the second half of each clock cycle.

Figure 8:
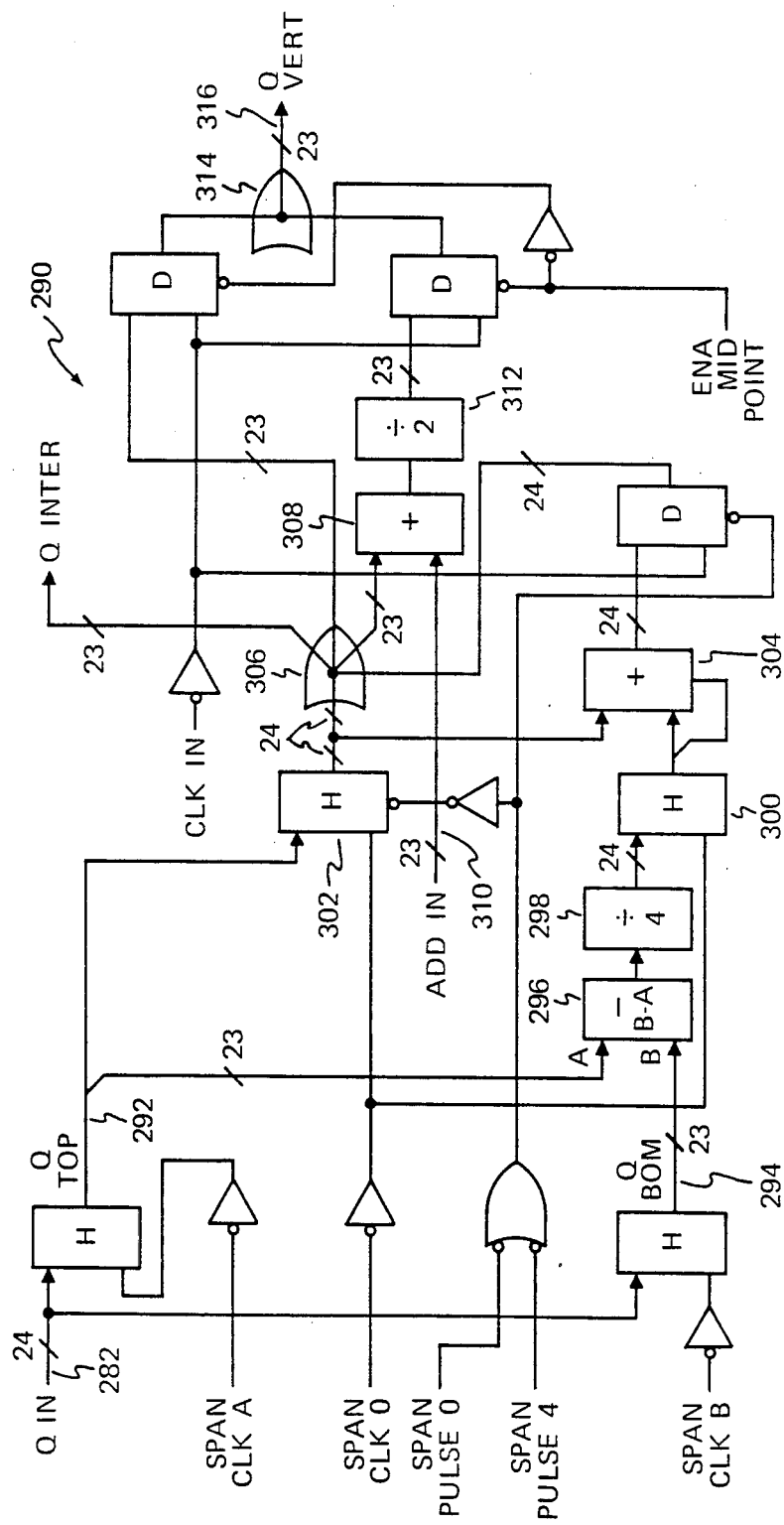
FIG. 8 is a schematic block diagram illustrating the vertical interpolator board of the present invention.

The vertical interpolator 290 shown in FIG. 8 receives a 24-bit common Q input 282 from the Po summer 274 shown in FIG. 7. At the start of the span, Q top 292 is subtracted from Q bottom 294 by chip 296 and divided by 4 at 298 and 300. Q-top 292 is stored in holding register 302. The outputs of registers 302 and 300 are added by adder 304 to yield a 24-bit incrementing value to provide an offset for each increment of the span. The output from register 302 is output as shown at 306 to adder 308 which sums the Q-top value with the ADD IN input 310 from the mating vertical interpolator board's incrementer (not shown). The sum is divided by two at 312 to provide an output which is tristated with the output from register 302 as shown at 314 to produce a Q-vert address output 316. A set of X-left, X-right, Y-left and Y-right vertical interpolator boards is required for the system. One set of boards is referred to as the left vertical interpolator, and the other set is referred to as the right vertical interpolator. The input to each of the boards will be loaded in the span processing time period prior to the span being output. The X-left board will receive Qij as the Q top left value and Qi8j as the Q bottom left value of a span. The X-right board will receive Qij8 as the Q top right input and the Qi8j8 as the Q bottom right value. The X-left board contains an incrementer that will sequence through Qij, Qi2j, Qi4j, and Qi6j. The right board contains an incrementer that will be used to sequence Qij8, Qi2j8, Qi4j8 and Qi6j8. These incrementer sequences will be repeated every four clock periods for a total of two times for the span. The incrementer on each board is connected to three places: an output adder, directly to an output register, and also to the backplane. The boards are connected on the backplane so that the final board output will be sequenced as shown in Table 3.

TABLE 3

| CLK | LEFT | RIGHT |
|-----|------|-------|
| 0 | Qij | Qij4 |
| 1 | Qi2j | Qi2j4 |
| 2 | Qi4j | Qi4j4 |
| 3 | Qi6j | Qi6j4 |
| 4 | Qij4 | Qij8 |
| 5 | Qi2j4 | Qi2j8 |
| 6 | Qi4j4 | Qi4j8 |
| 7 | Qi6j4 | Qi6j8 |

The board will provide a 23-bit output Q-vert 316 to the horizontal interpolator.

Figure 9:
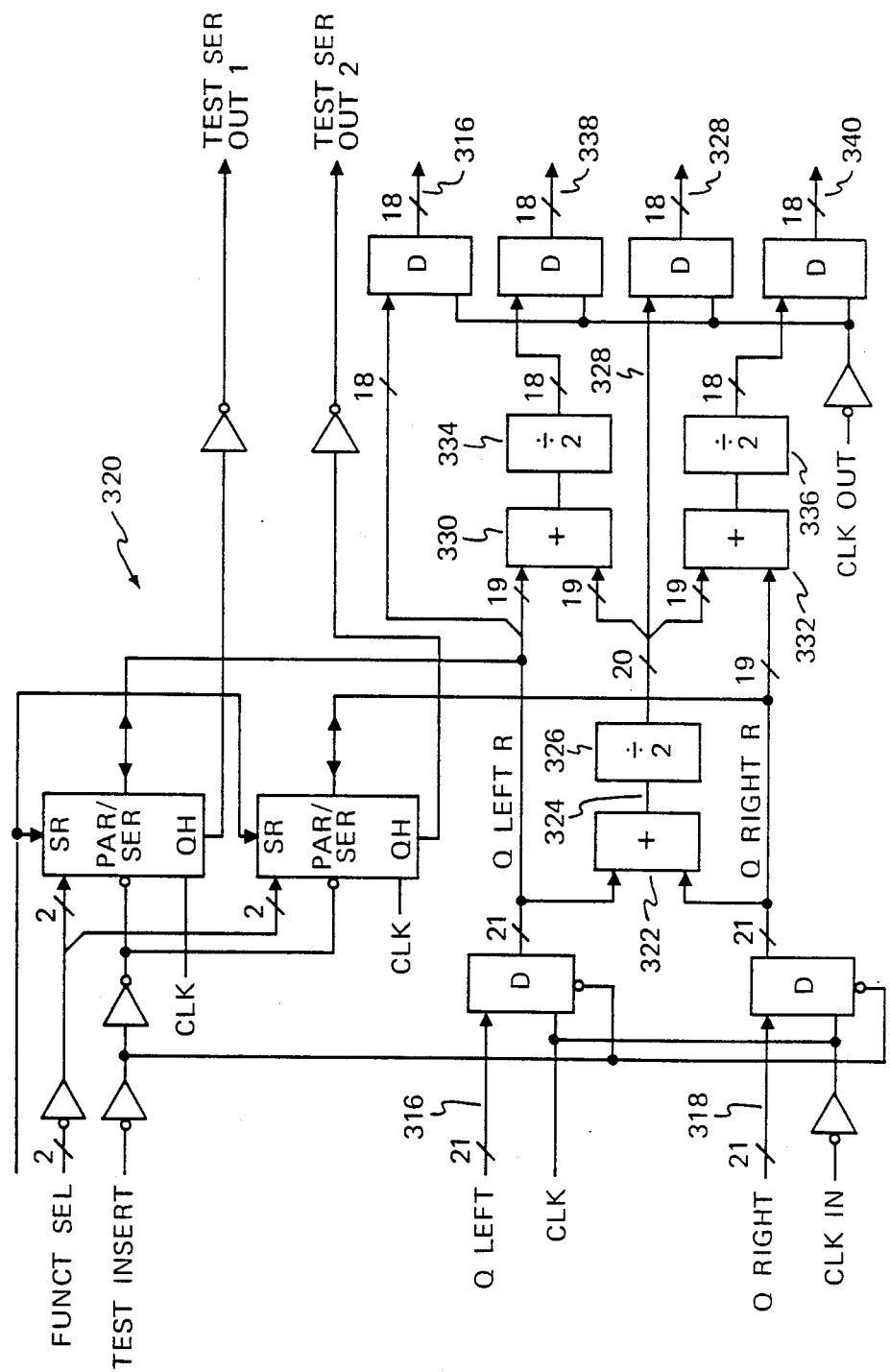
FIG. 9 is a schematic block diagram illustrating the horizontal interpolator of the present invention.

The horizontal interpolator 320 as shown in FIG. 9 functions to compute the three intermediate pixel Q values, given the Q value at the left side of the span input 316 from the vertical interpolator board 290 and the Q value at the right side of the input 318 from the mating interpolator board. The inputs 316, 318 are summed by adder 322 and the sum 324 divided by two at 326 to yield the Q value for the horizontal midpoint 328 between Q-left and Q-right. These steps are repeated by adders 330, 332 and dividers 334, 336 to yield the addresses 338, 340 which are respectively the one-fourth and three-fourths addresses in the span being processed. There are two horizontal interpolator boards, one for the X pattern and one for the Y pattern. The Q left input 316 provides the Q value for the left side of the span input from the vertical interpolator, and the Q right input 318 provides the Q value at the right side of the span input from the vertical interpolator board. The horizontal interpolator 320 calculates three intermediate pixel values which yield a cell map address for accessing the texture map memory for each pixel in the cell.

Figure 10:
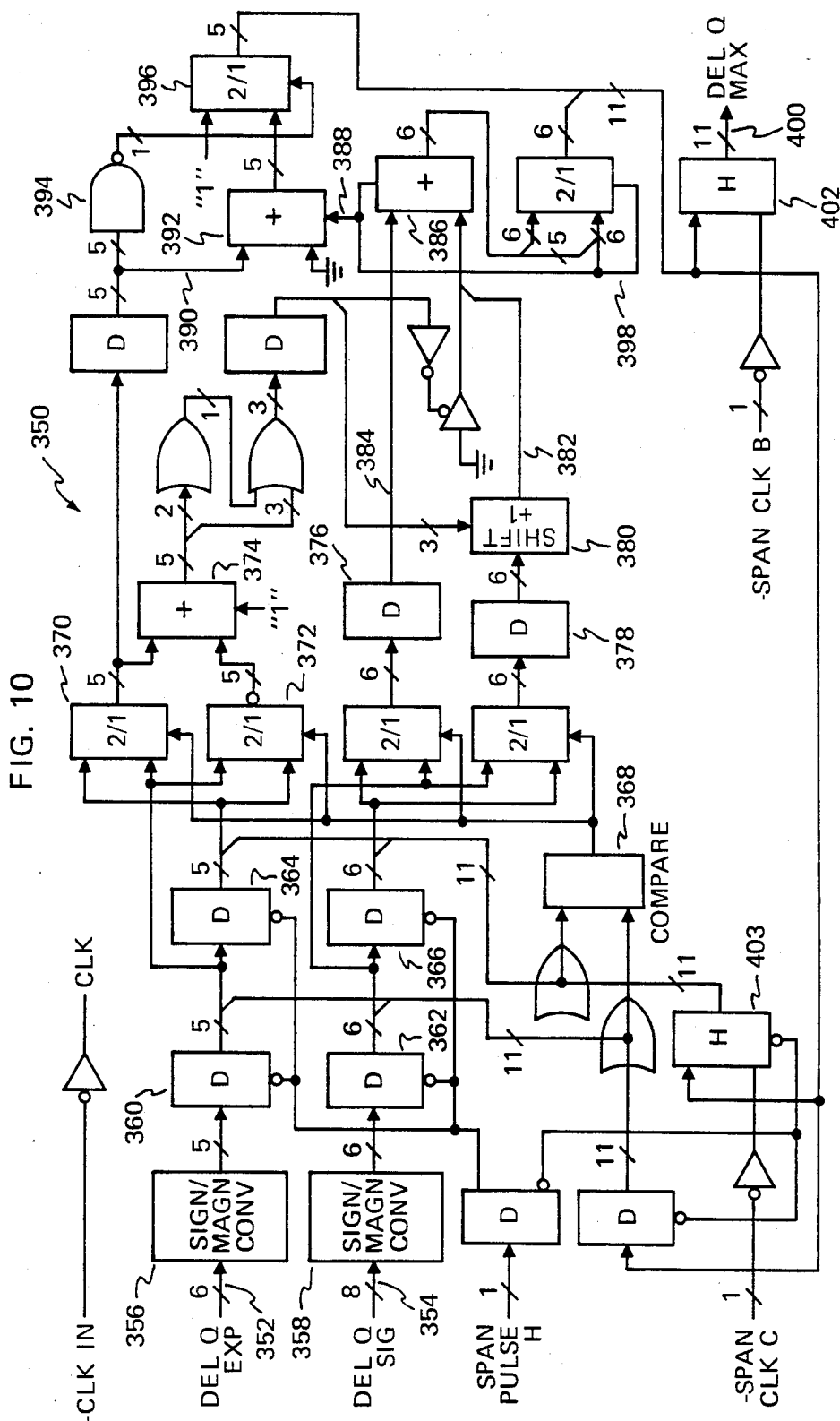
FIG. 10 is a schematic block diagram illustrating the board for calculating the maximum pattern gradient change in the image generator of the present invention.

The $\Delta Q$ Max calculator board 350 as shown in FIG. 10 is used to determine the maximum pattern gradient change for use in calculating cell texture LOD. The $\Delta Q$ inputs 352, 354 provide 6 bits of $\Delta Q$ exponent and 8 bits of $\Delta Q$ significand from the $\Delta Q$ calculator board, FIG. 7. The calculation begins with the floating point $\Delta Q$ inputs 352, 354. This input is converted at 356, 358 to sign magnitude form, so that comparisons may be performed more efficiently. The X $\Delta Q$'s in the I and J directions are first clocked into A registers 360, 362 and B registers 364, 366 for comparison by comparator 368. The larger of A or B is selected for addition with $\frac{1}{2}$ the smaller. The floating point add is set up by subtracting the smaller exponent from the larger. The significands are loaded into registers 376, 378. In the next clock period, the smaller significand is downshifted by the exponent difference plus one additional shift 380 to account for the $\frac{1}{2}$ addition. The shifted smaller significand 382 is added to the larger significand 384 by adder 386 during the same clock period. Provision is made for a carry bit 388 to bump the reference (larger) exponent 390 by adder 392. A clamp circuit comprising gate 394 and register 396 is provided for the exponent to maintain the final exponent within a 5-bit range. The carry 388 will be used to downshift the significand at multiplexer 396, so that proper scaling is maintained. Board 350 provides three identical calculations to produce three distinct $\Delta Q$ Max outputs, the first of which is the diagonal gradient for the X and Y patterns, which are labeled $\Delta QX$ Max and $\Delta QY$ Max, respectively. The X and Y Max gradients are combined to form an overall $\Delta Q$ Max which is the final output 400 from the board. The diagonal gradient is approximated from the orthogonal I and J pattern gradients by taking the Max gradient plus $\frac{1}{2}$ the smaller gradient. All three calculations are efficiently performed in time sequence by the same hardware. The final calculated $\Delta QX$ Max is saved in a holding register 403 during clock period D. The calculation is then repeated to determine $\Delta QY$ Max. This calculation will be available in four additional clock periods. At the end of this time period, the calculated values for $\Delta QX$ Max and $\Delta QY$ Max are tristated back through the same hardware to calculate the overall $\Delta Q$ Max. The gradients are sequentially generated in an 8 clock span period. The $\Delta Q$ Max output 400 provides an 11-bit output in floating point form with 5 bits of exponent and 6 bits of significand to the LOD/Alpha board to be used in the LOD calculation.

Figure 11A:
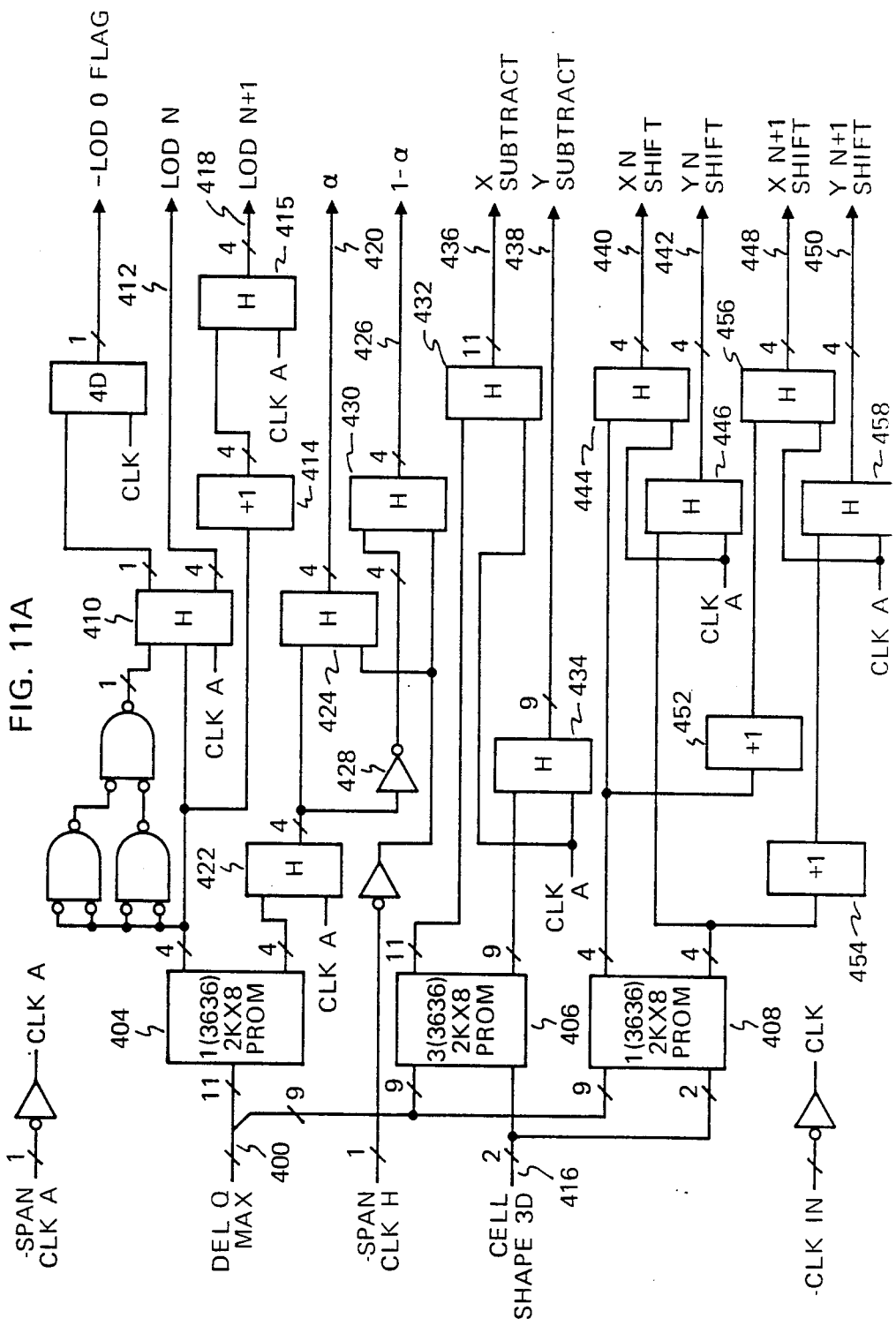
FIGS. 11A and 11B are a schematic block diagram illustrating the level of detail calculator of the present invention.
Figure 11B:
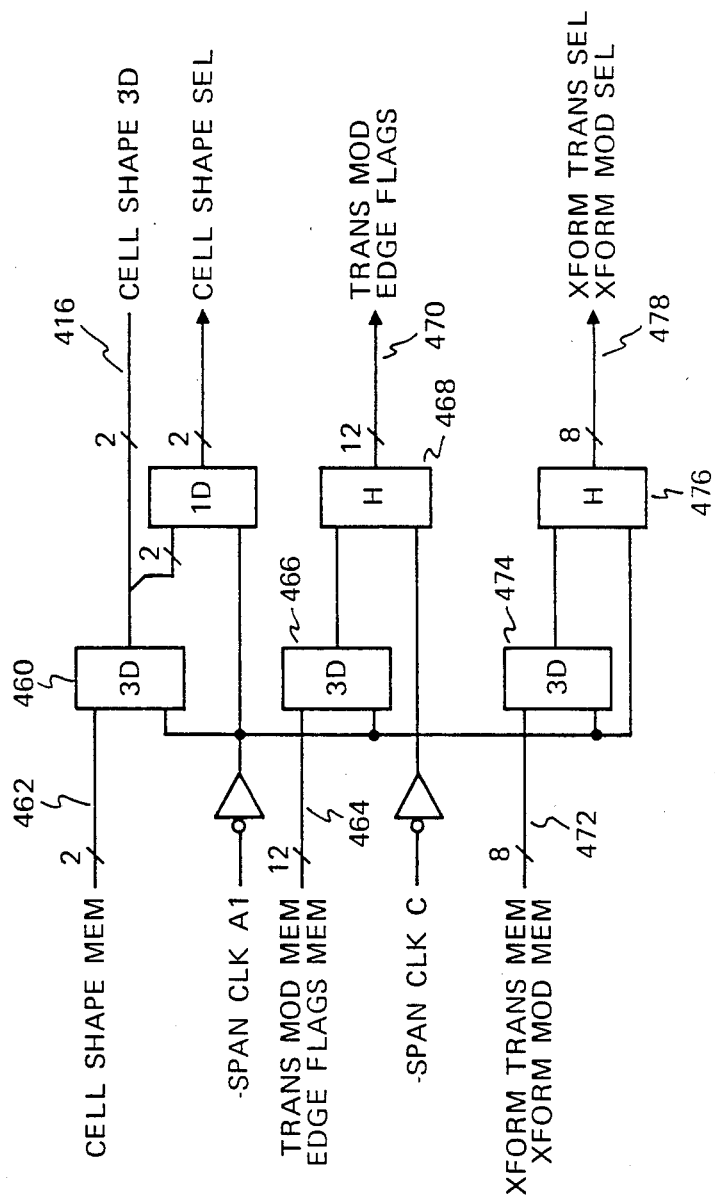

The LOD/alpha calculator board, FIG. 11 contains PROMs 404, 406, 408 for the computation of the LOD N, LOD N+1, alpha, 1-alpha, X and Y subtract, X and Y N and N+1 shift codes and delay registers 460, 466, 474 for cell shape select, transform map select and map edge select flags. The $\Delta Q$ Max input 400 is an 11-bit input calculated by the $\Delta Q$ Max calculator board, FIG. 10, which represents an average of the maximum gradients of both the X and Y pattern. The $\Delta Q$ Max is in floating point format with the exponent defined to be always positive. The cell shape input 416 is a 2-bit control input from the input memory which defines the map shape.

The LOD is a 4-bit number which is used to shift the cell map address for selection of the proper map LOD. The LOD is calculated by PROM 404 by first multiplying the floating point ΔQ Max input 400 by a scaling value presently defined to be 0.65 decimal. This fixed point constant will adjust for the minimum allowable LOD cell size. The resulting exponent with the addition of +5 is supplied to holding register 410 and the LOD number 412. An adder 414 provides an input to register 415 which yields LOD N+1 418 as an output. The LOD is limited to a maximum value of 8 and a minimum value of 0. Alpha 420 is defined to be the 2E-2 through 2E-5 remaining fractional bit of the adjusted ΔQ Max significand, and is supplied from PROM 404 to registers 422 and 424. These bits are a measure of the relative proximity between two different LODs and are used to do the LOD map blending on the cell alpha blend board described hereinafter. If the LOD maximum clamp is enabled, then alpha will be set to all ones. If the LOD minimum clamp is enabled, then alpha will be set to 0. The $1-\alpha$ term 426 is generated by inverting the 4 alpha bits by inverter 428 and supplied to register 430.

Three PROMs (Only one 406 is shown.) are used to generate 20 bits worth of the X and Y two's complement −0.5 subtract coefficients. These PROMs derive the equivalent positive exponent internally using the same procedure as the LOD PROMs. The subtract coefficient PROMs 406 also have the 2-bit cell shape select control 416 as an input so that compensation for cell map shape can be made. The PROMs 406 generate an 11-bit X subtract coefficient held in register 432 for output 436, and a 9-bit Y subtract coefficient held in register 434 for output 438.

The X and Y shift controls 440, 442 are used for scaling the fractional Q bit used for texture smoothing on the cell smoother board. The shift codes are similar to the LOD numbers except that a separate adjustment is required for both the X and Y fractional Q's to compensate for the cell map shape. This PROM derives the equivalent positive exponent internally using the same procedure as the LOD PROM. The PROM 408 also has the 2-bit cell shape select control 416 as an input so that compensation for cell map shape can be made. The equivalent positive exponent and cell shape code are then used to generate the shift codes 440, 442 stored in registers 444, 446, respectively. The X/Y shift codes for the N+1 cell smoother boards are calculated by adding 1, as shown in 452 and 454 to the N shift code values held in registers 456, 458. The cell shape select input 416 (FIG. 11B) is derived by register 460 from a cell shape input 462 from the vector processor. A translucency modulation and edge flag input 464 is supplied to register 466 for holding in register 468 to be output as a translucency modulation and edge flag output 470 to the translucency modulation board to be described hereinafter. A transform input 472 from the translucency memory and the modulation memory is held in registers 474, 476 for output 478 to the translucency and modulation board.

Figure 12:
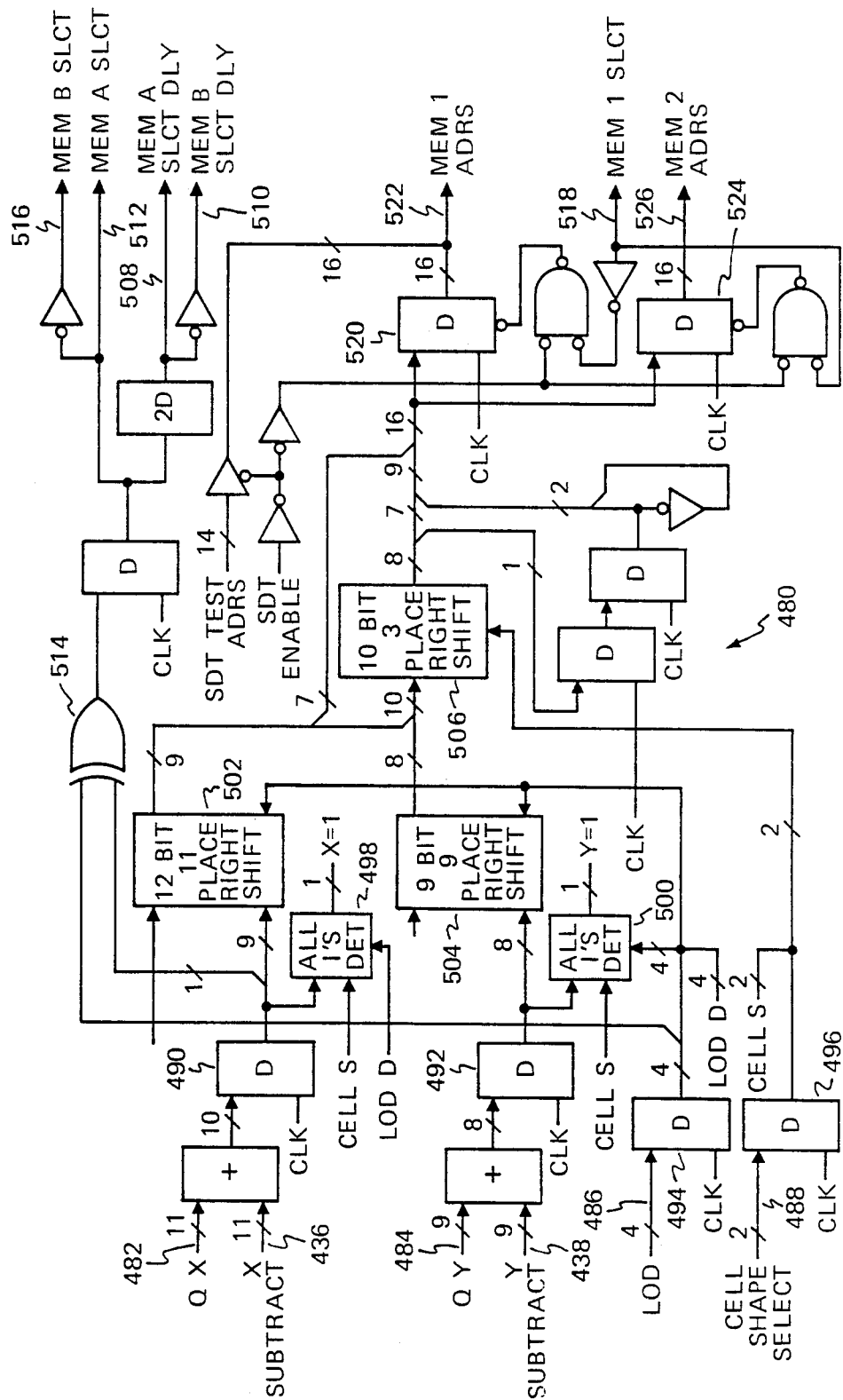
FIG. 12 is a schematic block diagram illustrating the cell map address calculator of the present invention.

The cell map address board 480 as shown in FIG. 12 is used to address the cell map memories. Two boards are required for each pixel calculation, one for the level of detail N and one for the level of detail N+1. The cell map address board combines the X and Y Q values 482, 484 to form one address for the cell memory. A −0.5 offset is also inserted to the Qx and Qy values, so that the correct four surrounding cells for the current pixel calculation are selected. This offset would normally be subtracted after the address LOD shift, so that the LOD map selection may be made by shifting a pattern of all "1s" and a "0" into the most significant bit address portion. A cell shape select code is also used to correct the shift operation and addressing to match the map shape selected.

The cell map address board 480 receives an 11-bit input 482 from a horizontal interpolator board which represents the Q value for the X component for the current pixel, and a 9-bit input 484 from the horizontal interpolator board which represents the Q value for the Y component for the current pixel. The cell map address board also receives an 11-bit input 436 adjustment to obtain the −0.5 subtract for the X input and a 9-bit input 438 adjustment to obtain the −0.5 subtract for the Y input, both of which originate from the LOD/alpha calculator board. A 4-bit LOD input code 486 is supplied from the LOD calculator board to select the correct map level of detail. The LOD input code 486 will be LOD N for the LOD N board and LOD N+1 for the LOD N+1 board. The cell map address board also receives a 2-bit input code, CELL SHAPE SELECT 488 which selects the map shape factor. This signal originates from the input memory but is delayed to the proper register position. The registers 490 and 492 combine the Q values and the subtract values to form addresses supplied to shifters 502 and 504. The LOD input 486 is input to register 494, and the 2-bit cell shape select input 488 is input to register 496. The detectors 498 and 500 receive Qx and Qy values respectively from registers 490 and 492 and combine these values with the LOD input 486 and cell shape select input 488 to determine the presence of the all ones condition. The cell map address board 480 also receives a Mem1 select input 518 which will enable register 520 to output the Mem1 address 522 if set to a logic 1, and will enable register 524 to output the Mem2 address 526 if set to a logic 0, and a clock-in signal from the system reference clock. Outputs from the cell map address board include a MemA select 512, MemB select 516 to control the LOD N or LOD N+1 address to the A or B memory, a MemA select delay output 508 and MemB select delay output 510 to select the A or B memory output using the 4-to-1 multiplexer on the cell smoother board as well as the Mem1 address output 522 which is a 16-bit output address tristated with the Mem2 address of the associated LOD mating board, and a Mem2 address output 526 which is a 16-bit output address tristated with the Mem2 address of the associated LOD mating board. The Mem1 and Mem2 address outputs are used as the address to either the A or B cell memories for the cell Map look-up and to enable the outputs called Out 1 Select and Out 2 Select of the Cell Map. These lines are used to enable either the 8 most significant bits or the 8 middle bits of the cell map. This combination forms a 32K portion of the cell map memory. The outputs from the cell map address board 480 also include an X EQ Max and Y EQ Max output which will be set to a logic "1", if the corresponding address section is at the map-end address as indicated by inputs from detectors 498, 500, respectively. These signals are connected to the cell smoother board to be used for map boundary control.

TABLE 4

| MAP ADRS BIT | LOD NUMBER | | | | | | | | |
|---|---|---|---|---|---|---|---|---|---|
| | 0 | 1 | 2 | 3 | 4 | 5 | 6 | 7 | 8 |
| 2E13 | X-2 | 0 | 1 | 1 | 1 | 1 | 1 | 1 | 1 |
| 2E12 | X-3 | X-2 | 0 | 1 | 1 | 1 | 1 | 1 | 1 |
| 2E11 | X-4 | X-3 | X-2 | 0 | 1 | 1 | 1 | 1 | 1 |
| 2E10 | X-5 | X-4 | X-3 | X-2 | 0 | 1 | 1 | 1 | 1 |
| 2E9 | X-6 | X-5 | X-4 | X-3 | X-2 | 0 | 1 | 1 | 1 |
| 2E8 | X-7 | X-6 | X-5 | X-4 | X-3 | X-2 | 0 | 1 | 1 |
| 2E7 | X-8 | X-7 | X-6 | X-5 | X-4 | X-3 | X-2 | 0 | 1 |
| 2E6 | Y-1 | Y-1 | 0 | 0 | 0 | 0 | 0 | 0 | 0 |
| 2E5 | Y-2 | Y-2 | Y-3 | 0 | 0 | 0 | 0 | 0 | 0 |
| 2E4 | Y-3 | Y-3 | Y-2 | Y-1 | 0 | 0 | 0 | 0 | 0 |
| 2E3 | Y-4 | Y-4 | Y-3 | Y-2 | Y-1 | 0 | 0 | 0 | 0 |
| 2E2 | Y-5 | Y-5 | Y-4 | Y-3 | Y-2 | Y-1 | 0 | 0 | 0 |
| 2E1 | Y-6 | Y-6 | Y-5 | Y-4 | Y-3 | Y-2 | Y-1 | 0 | 0 |
| 2E0 | Y-7 | Y-7 | Y-6 | Y-5 | Y-4 | Y-3 | Y-2 | Y-1 | 0 |
| A/I | Y-8 | X | X | X | X | X | X | X | X |

Map Size: 256 × 256
Cell Shape (2E1,2E0): 00

TABLE 5

| MAP ADRS BIT | LOD NUMBER | | | | | | | | | |
|---|---|---|---|---|---|---|---|---|---|---|
| | 0 | 1 | 2 | 3 | 4 | 5 | 6 | 7 | 8 | 9 |
| 2E13 | X-2 | 0 | 1 | 1 | 1 | 1 | 1 | 1 | 1 | 1 |
| 2E12 | X-3 | X-2 | 0 | 1 | 1 | 1 | 1 | 1 | 1 | 1 |
| 2E11 | X-4 | X-3 | X-2 | 0 | 1 | 1 | 1 | 1 | 1 | 1 |
| 2E10 | X-5 | X-4 | X-3 | X-2 | 0 | 1 | 1 | 1 | 1 | 1 |
| 2E9 | X-6 | X-5 | X-4 | X-3 | X-2 | 0 | 1 | 1 | 1 | 1 |
| 2E8 | X-7 | X-6 | X-5 | X-4 | X-3 | X-2 | 0 | 1 | 1 | 1 |
| 2E7 | X-8 | X-7 | X-6 | X-5 | X-4 | X-3 | X-2 | 0 | 1 | 1 |
| 2E6 | X-9 | X-8 | X-7 | X-6 | X-5 | X-4 | X-3 | X-2 | 0 | 1 |
| 2E5 | Y-1 | Y-1 | 0 | 0 | 0 | 0 | 0 | 0 | 0 | 0 |
| 2E4 | Y-2 | Y-2 | Y-1 | 0 | 0 | 0 | 0 | 0 | 0 | 0 |
| 2E3 | Y-3 | Y-3 | Y-2 | Y-1 | 0 | 0 | 0 | 0 | 0 | 0 |
| 2E2 | Y-4 | Y-4 | Y-3 | Y-2 | Y-1 | 0 | 0 | 0 | 0 | 0 |
| 2E1 | Y-5 | Y-5 | Y-3 | Y-3 | Y-2 | Y-1 | 0 | 0 | 0 | 0 |
| 2E0 | Y-6 | Y-6 | Y-5 | Y-4 | Y-3 | Y-2 | Y-1 | 0 | 0 | 0 |
| A/I | Y-7 | X | X | X | X | X | X | X | X | X |

Map Size: 512 × 128
Cell Shape (2E1,2E0): 01

TABLE 6

| MAP ADRS BIT | LOD NUMBER | | | | | | | | | | |
|---|---|---|---|---|---|---|---|---|---|---|---|
| | 0 | 1 | 2 | 3 | 4 | 5 | 6 | 7 | 8 | 9 | 10 |
| 2E13 | X-2 | 0 | 1 | 1 | 1 | 1 | 1 | 1 | 1 | 1 | 1 |
| 2E12 | X-3 | X-2 | 0 | 1 | 1 | 1 | 1 | 1 | 1 | 1 | 1 |
| 2E11 | X-4 | X-3 | X-2 | 0 | 1 | 1 | 1 | 1 | 1 | 1 | 1 |
| 2E10 | X-5 | X-4 | X-3 | X-2 | 0 | 1 | 1 | 1 | 1 | 1 | 1 |
| 2E9 | X-6 | X-5 | X-4 | X-3 | X-2 | 0 | 1 | 1 | 1 | 1 | 1 |
| 2E8 | X-7 | X-6 | X-5 | X-4 | X-3 | X-2 | 0 | 1 | 1 | 1 | 1 |
| 2E7 | X-8 | X-7 | X-6 | X-5 | X-4 | X-3 | X-2 | 0 | 1 | 1 | 1 |
| 2E6 | X-9 | X-8 | X-7 | X-6 | X-5 | X-4 | X-3 | X-2 | 0 | 1 | 1 |
| 2E5 | X-10 | X-9 | X-8 | X-7 | X-6 | X-5 | X-4 | X-3 | X-2 | 0 | 1 |
| 2E4 | Y-1 | Y-1 | 0 | 0 | 0 | 0 | 0 | 0 | 0 | 0 | 0 |
| 2E3 | Y-2 | Y-2 | Y-1 | 0 | 0 | 0 | 0 | 0 | 0 | 0 | 0 |
| 2E2 | Y-3 | Y-3 | Y-2 | Y-1 | 0 | 0 | 0 | 0 | 0 | 0 | 0 |
| 2E1 | Y-4 | Y-4 | Y-3 | Y-2 | Y-1 | 0 | 0 | 0 | 0 | 0 | 0 |
| 2E0 | Y-5 | Y-5 | Y-4 | Y-3 | Y-2 | Y-1 | 0 | 0 | 0 | 0 | 0 |
| A/I | Y-6 | X | X | X | X | X | X | X | X | X | X |

Map Size: 1024 × 64
Cell Shape (2E1,2E0): 10

The LOD shift operations are shown in Tables 4, 5 and 6 for three map shapes. The X pattern is always defined to be the denser pattern and is used to form the most significant bits of the map address. The X msb bit is exclusive or'ed as shown at 514 with the LSB of the LOD code to obtain MemA/MemB select control signals 512, 516, respectively. The lsb of the Y pattern is only needed for LOD 0 and is used to form the output 1, 2 select lines to the cell memory. Note the pattern of all "1s" and a "0" which is shifted in from the msb end of the address select of the different map LODs.

The −0.5 subtract control before the shift is actually performed with an add operation. The two's complement equivalent of the number to be subtracted is therefore supplied to the board. The patterns for the X and Y substract inputs are shown in Tables 7, 8 and 9. These patterns are wired shifted on the backplane for the LOD N+1 board slot.

TABLE 7

| ADDER INPUT | LOD NUMBER | | | | | | | ADDER INPUT | LOD NUMBER | | | | | | |
|---|---|---|---|---|---|---|---|---|---|---|---|---|---|---|---|
| | 0 | 1 | 2 | 3 | 4 | 5 | 6 | | 0 | 1 | 2 | 3 | 4 | 5 | 6 |
| 2E-1 | 1 | 1 | 1 | 1 | 1 | 1 | 1 | 2E-1 | 1 | 1 | 1 | 1 | 1 | 1 | 1 |
| 2E-2 | 1 | 1 | 1 | 1 | 1 | 1 | 1 | 2E-2 | 1 | 1 | 1 | 1 | 1 | 1 | 0 |
| 2E-3 | 1 | 1 | 1 | 1 | 1 | 1 | 1 | 2E-3 | 1 | 1 | 1 | 1 | 1 | 0 | 0 |
| 2E-4 | 1 | 1 | 1 | 1 | 1 | 1 | 1 | 2E-4 | 1 | 1 | 1 | 1 | 0 | 0 | 0 |
| 2E-5 | 1 | 1 | 1 | 1 | 1 | 1 | 1 | 2E-5 | 1 | 1 | 1 | 0 | 0 | 0 | 0 |
| 2E-6 | 1 | 1 | 1 | 1 | 1 | 1 | 0 | 2E-6 | 1 | 1 | 0 | 0 | 0 | 0 | 0 |
| 2E-7 | 1 | 1 | 1 | 1 | 1 | 0 | 0 | 2E-7 | 1 | 0 | 0 | 0 | 0 | 0 | 0 |
| 2E-8 | 1 | 1 | 1 | 1 | 0 | 0 | 0 | 2E-8 | 0 | 0 | 0 | 0 | 0 | 0 | 0 |
| 2E-9 | 1 | 1 | 1 | 0 | 0 | 0 | 0 | 2E-9 | 0 | 0 | 0 | 0 | 0 | 0 | 0 |
| 2E-10 | 1 | 1 | 0 | 0 | 0 | 0 | 0 | Corresponding Y = 64 MAP | | | | | | | |
| 2E-11 | 1 | 0 | 0 | 0 | 0 | 0 | 0 | | | | | | | | |

Map: X = 1024 for LOD N
shift left one place for LOD N + 1

TABLE 8

| ADDER INPUT | LOD NUMBER | | | | | | | | ADDER INPUT | LOD NUMBER | | | | | | | |
|---|---|---|---|---|---|---|---|---|---|---|---|---|---|---|---|---|---|
| | 0 | 1 | 2 | 3 | 4 | 5 | 6 | 7 | | 0 | 1 | 2 | 3 | 4 | 5 | 6 | 7 |
| 2E-1 | 1 | 1 | 1 | 1 | 1 | 1 | 1 | 1 | 2E-1 | 1 | 1 | 1 | 1 | 1 | 1 | 1 | 1 |
| 2E-2 | 1 | 1 | 1 | 1 | 1 | 1 | 1 | 1 | 2E-2 | 1 | 1 | 1 | 1 | 1 | 1 | 1 | 0 |
| 2E-3 | 1 | 1 | 1 | 1 | 1 | 1 | 1 | 1 | 2E-3 | 1 | 1 | 1 | 1 | 1 | 1 | 0 | 0 |
| 2E-4 | 1 | 1 | 1 | 1 | 1 | 1 | 1 | 0 | 2E-4 | 1 | 1 | 1 | 1 | 1 | 0 | 0 | 0 |
| 2E-5 | 1 | 1 | 1 | 1 | 1 | 1 | 0 | 0 | 2E-5 | 1 | 1 | 1 | 1 | 0 | 0 | 0 | 0 |
| 2E-6 | 1 | 1 | 1 | 1 | 1 | 0 | 0 | 0 | 2E-6 | 1 | 1 | 1 | 0 | 0 | 0 | 0 | 0 |
| 2E-7 | 1 | 1 | 1 | 1 | 0 | 0 | 0 | 0 | 2E-7 | 1 | 1 | 0 | 0 | 0 | 0 | 0 | 0 |
| 2E-8 | 1 | 1 | 1 | 0 | 0 | 0 | 0 | 0 | 2E-8 | 1 | 0 | 0 | 0 | 0 | 0 | 0 | 0 |
| 2E-9 | 1 | 1 | 0 | 0 | 0 | 0 | 0 | 0 | 2E-9 | 0 | 0 | 0 | 0 | 0 | 0 | 0 | 0 |
| 2E-10 | 1 | 0 | 0 | 0 | 0 | 0 | 0 | 0 | Corresponding Y = 128 MAP | | | | | | | | |
| 2E-11 | 0 | 0 | 0 | 0 | 0 | 0 | 0 | 0 | | | | | | | | | |

MAP: X = 512 for LOD N
shift left one place for LOD N + 1

TABLE 9

| ADDER INPUT | LOD NUMBER | | | | | | | | | ADDER INPUT | LOD NUMBER | | | | | | | | |
|---|---|---|---|---|---|---|---|---|---|---|---|---|---|---|---|---|---|---|---|
| | 0 | 1 | 2 | 3 | 4 | 5 | 6 | 7 | 8 | | 0 | 1 | 2 | 3 | 4 | 5 | 6 | 7 | 8 |
| 2E-1 | 1 | 1 | 1 | 1 | 1 | 1 | 1 | 1 | 1 | 2E-1 | 1 | 1 | 1 | 1 | 1 | 1 | 1 | 1 | 1 |
| 2E-2 | 1 | 1 | 1 | 1 | 1 | 1 | 1 | 1 | 0 | 2E-2 | 1 | 1 | 1 | 1 | 1 | 1 | 1 | 1 | 0 |
| 2E-3 | 1 | 1 | 1 | 1 | 1 | 1 | 1 | 0 | 0 | 2E-3 | 1 | 1 | 1 | 1 | 1 | 1 | 1 | 0 | 0 |
| 2E-4 | 1 | 1 | 1 | 1 | 1 | 1 | 0 | 0 | 0 | 2E-4 | 1 | 1 | 1 | 1 | 1 | 1 | 0 | 0 | 0 |
| 2E-5 | 1 | 1 | 1 | 1 | 1 | 0 | 0 | 0 | 0 | 2E-5 | 1 | 1 | 1 | 1 | 1 | 0 | 0 | 0 | 0 |
| 2E-6 | 1 | 1 | 1 | 1 | 0 | 0 | 0 | 0 | 0 | 2E-6 | 1 | 1 | 1 | 1 | 0 | 0 | 0 | 0 | 0 |
| 2E-7 | 1 | 1 | 1 | 0 | 0 | 0 | 0 | 0 | 0 | 2E-7 | 1 | 1 | 1 | 0 | 0 | 0 | 0 | 0 | 0 |
| 2E-8 | 1 | 1 | 0 | 0 | 0 | 0 | 0 | 0 | 0 | 2E-8 | 1 | 1 | 0 | 0 | 0 | 0 | 0 | 0 | 0 |
| 2E-9 | 1 | 0 | 0 | 0 | 0 | 0 | 0 | 0 | 0 | 2E-9 | 1 | 0 | 0 | 0 | 0 | 0 | 0 | 0 | 0 |
| 2E-10 | 0 | 0 | 0 | 0 | 0 | 0 | 0 | 0 | 0 | Corresponding Y = 256 MAP | | | | | | | | | |
| 2E-11 | 0 | 0 | 0 | 0 | 0 | 0 | 0 | 0 | 0 | | | | | | | | | | |

MAP: X = 256 for LOD N
shift left one place for LOD N + 1

A cell map is defined to be either 256×256, 512×128, or 1024×64. The maps require a total storage of 86K nibbles (4 bits of word width for each location). Each coarser map LOD requires a factor of four less storage; e.g., LOD 0 requires a 64K map memory, and LOD 1 requires a 16K map memory. The map storage must be arranged so that the computed map LOD N and the next coarser LOD N+1 are available simultaneously. This requirement is satisfied by the breaking up the map storage into separate memories A and B as shown in Table 10. Note that memory A and B alternate lower and upper map portions depending upon which LOD is being addressed. This alternation is controlled on the board by tristating either the LOD N or LOD N+1 card output to the A or B memory board depending upon the LSB bit of the LOD number.

TABLE 10

| LOD | (48K × 4) MEM A ADRS | (48K × 4) MEM B ADRS | TOTAL REQUIRED STORAGE per LOD LEVEL |
|---|---|---|---|
| 0 | 0 → 32,767 | 32,768 → 65,535 | 32K |
| 1 | 8,192 → 16,383 | 0 → 8,191 | 8K |
| 2 | 0 → 2,047 | 2,048 → 4,095 | 2K |
| 3 | 512 → 1,023 | 0 → 511 | 512 |
| 4 | 0 → 127 | 128 → 255 | 128 |
| 5 | 32 → 63 | 0 → 31 | 32 |
| 6 | 0 → 7 | 8 → 15 | 8 |
| 7 | 2 → 3 | 0 → 1 | 2 |
| 8 | 1 | 1 | 1 |

In addition to the separate A and B storage requirement, cell smoothing requires that four maps be available for each pixel. This is due to a need to calculate a pixel intensity based upon smoothing between the four cells whose centers form a polygon surrounding the pixel center. The four maps are designated XY, XY1, X1Y, and X1Y1. The LOD calculation controls the map cell to pixel size ratio.

Once a particular map for a LOD is computed, the address for the XY cell is obtained by subtracting 0.5 from the X and Y address components (see Tables 7, 8 and 9). The four maps are stored at the XY address, so that all the maps will be available when only the XY address is supplied. A total of 43K nibble locations are required for each of the A and B memories.

Figure 13:
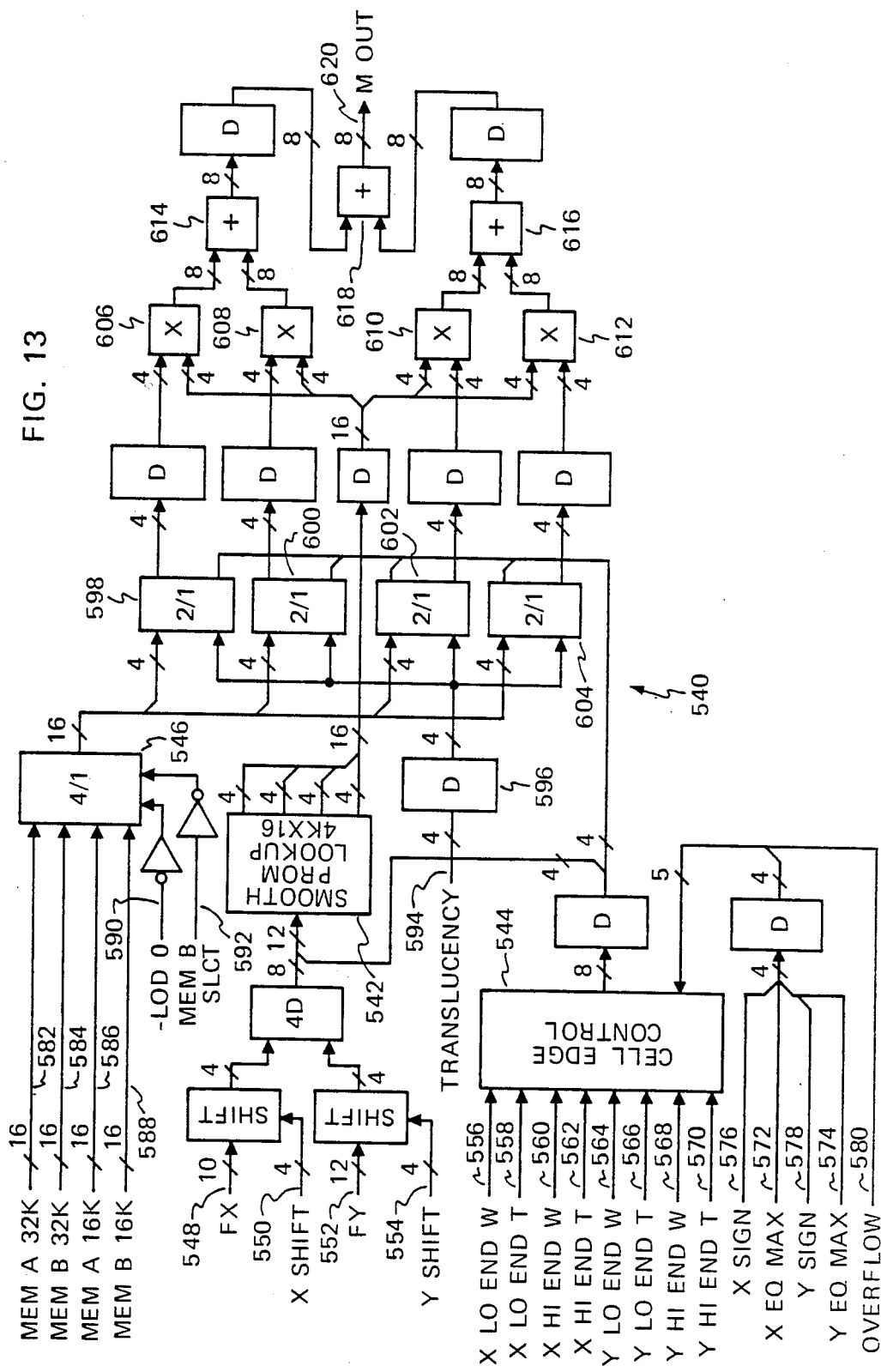
FIG. 13 is a schematic block diagram illustrating the cell smoothing function of the present invention.

The cell smoother board 540 as shown in FIG. 13 provides the blend of the four cells surrounding the pixel into an overall modulation which reflects the relative distance of each cell center to the pixel center. The fractional values of the X and Y Q values are used as a direct measure of the cell distance as follows:

$$M = Mxy *(1 - f(x))*(1 - f(Y)) +$$
$$Mxy1 *(1 - f(x))*(f(y)) + Mx1y *(f(x))*(1 - f(y)) +$$
$$Mx1y1 *(f(x))*(f(y))$$

Equation 5

This formula is calculated with a PROM lookup table 542. The fractional Q values are first shifted for LOD adjustment before being routed to the PROM. Separate calculations are required for LOD N and LOD N+1 of each pixel position, thus a total of 8 boards are required for the system. The board includes cell edge control 544 for processing cell edge conditions. Provision is made for substitution of a translucency word from the input memory as one of the cell edge control selections. A 4-to-1 multiplexer 546 on the board selects memory A or memory B input and selects either the 32K LOD 0 or 16K greater than LOD 0 map as a board input.

The cell smoother board 540 receives as inputs: FX 548, 10-bits of fractional input QX which originate from the horizontal interpolator board; FY 552, 12-bits of fractional input QY which originate from the Y horizontal interpolator boards; an X shift 550 and Y shift 554 control inputs which originate from the LOD/alpha calculation board. The cell edge control 544 receives XY end flags 556–570 which originate from the input memory to provide cell edge data to the board but are delayed to be in synchronism with the inputs from the interpolator boards. Cell edge control 544 receives X EQ Max 572 and Y EQ Max 574 input flags which are address top input flags, which originate from the cell map address board. An X sign input 576 and a Y sign input 578 are provided as the Q sign bit input, and X or Y overflow inputs 580 from the same board provide Q overflow inputs to the cell edge control 544. Multiplexer 546 receives a set of four 16-bit inputs, MemA 32K 582, MemB 32K 584, MemA 16K 586 and MemB 16K 588 from the cell memory boards as a control input for accessing the system memory. An LOD 0 flag 590 input controls the selection of 32K memory only of the LOD N board. The memory B select 592 input control originates from the cell map address board and is connected to the MemB select signal for the LOD N+1 card position. Translucency is input in 4 input lines as shown at 594 which come from the input memory after being appropriately delayed, as shown at 596. The translucency threshold value is defined as the binary value beyond which complete transparency is to be forced. The multiplexers 598, 600, 602, 604 selectively transmit modulations Mxy, Mxy1, Mx1y and Mx1y1 or the translucency code to multipliers 606, 608, 610, 612, respectively. Inputs from the PROM lookup 542 are also input to the multipliers and the products are output to adders 614, 616 and 618 to produce M out 620 as in Equation 6. The output from the board, M out, is an 8-bit output which adds four additional fractional bits obtaired by interpolation from the four-bit cell values. A set of eight cell smoother boards provides M out values to the cell α blend board.

Figure 14:
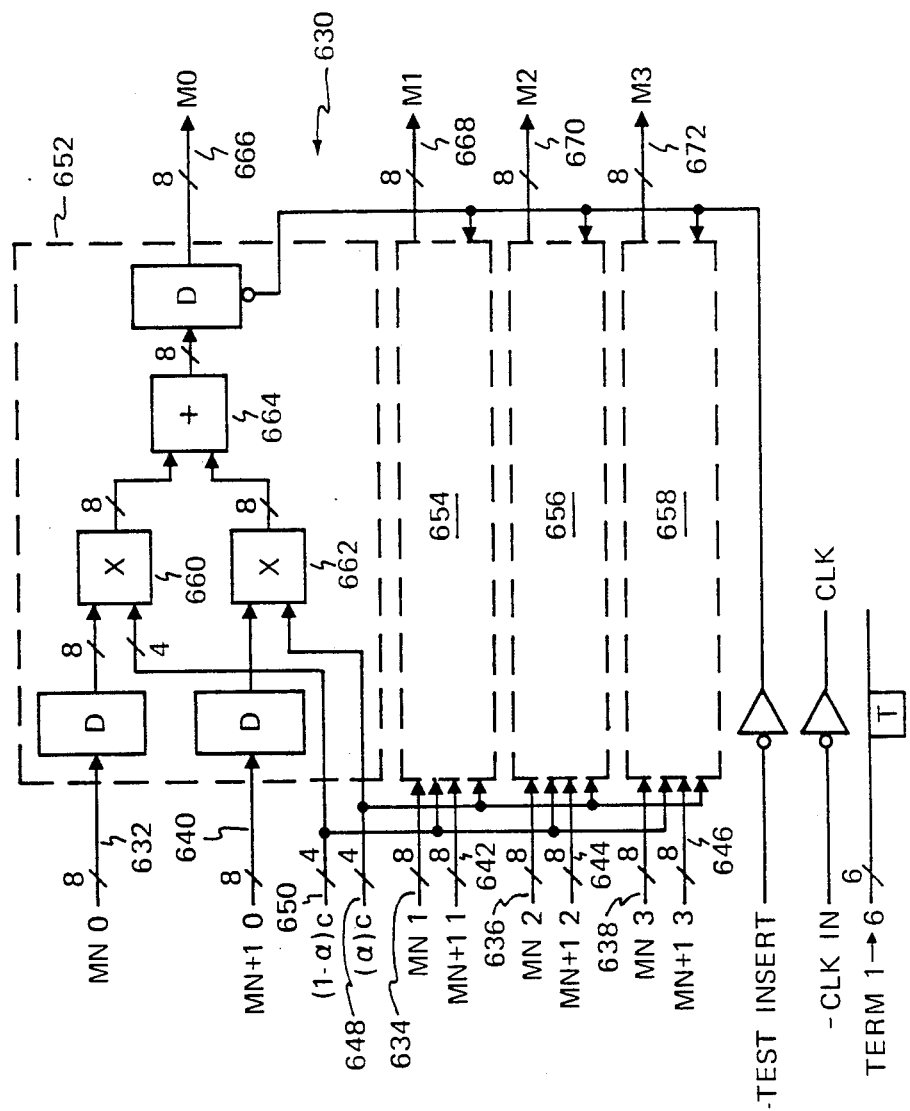
FIG. 14 is a schematic block diagram illustrating the cell blending function of the present invention.

A cell α blend board 630 as shown in FIG. 14 generates a smooth blend between cell map LOD N and LOD N+1, the next coarser level. The board processes four pixels. The output modulation is calculated as follows:

$$M = \alpha * M(N+1) + (1-\alpha) * M(N) \quad \text{Equation 6}$$

The cell α blend board receives a set of M(N)X inputs 632, 634, 636, 638 which is one of the four 8-bit modulatior inputs which originate from the LOD N map and a set of M(N+1) inputs 640, 642, 644, 646 which is one of the four 8-bit modulation inputs from the LOD N+1 map. The cell α board also receives an α input 648 which is a 4-bit fractional input generated by the LOD α calculator board, and the (1−α) input 650 which is a 4-bit 1's complement of α. The cell α blend function calculators 652, 654, 656, 658 include multipliers 660, 662 which provide product outputs to adder 664. The cell α blend board provides a plurality of 8-bit modulation M(x) outputs 666, 668, 670, 672 which are supplied as inputs to the translucency modulation transform board.

Figure 15:
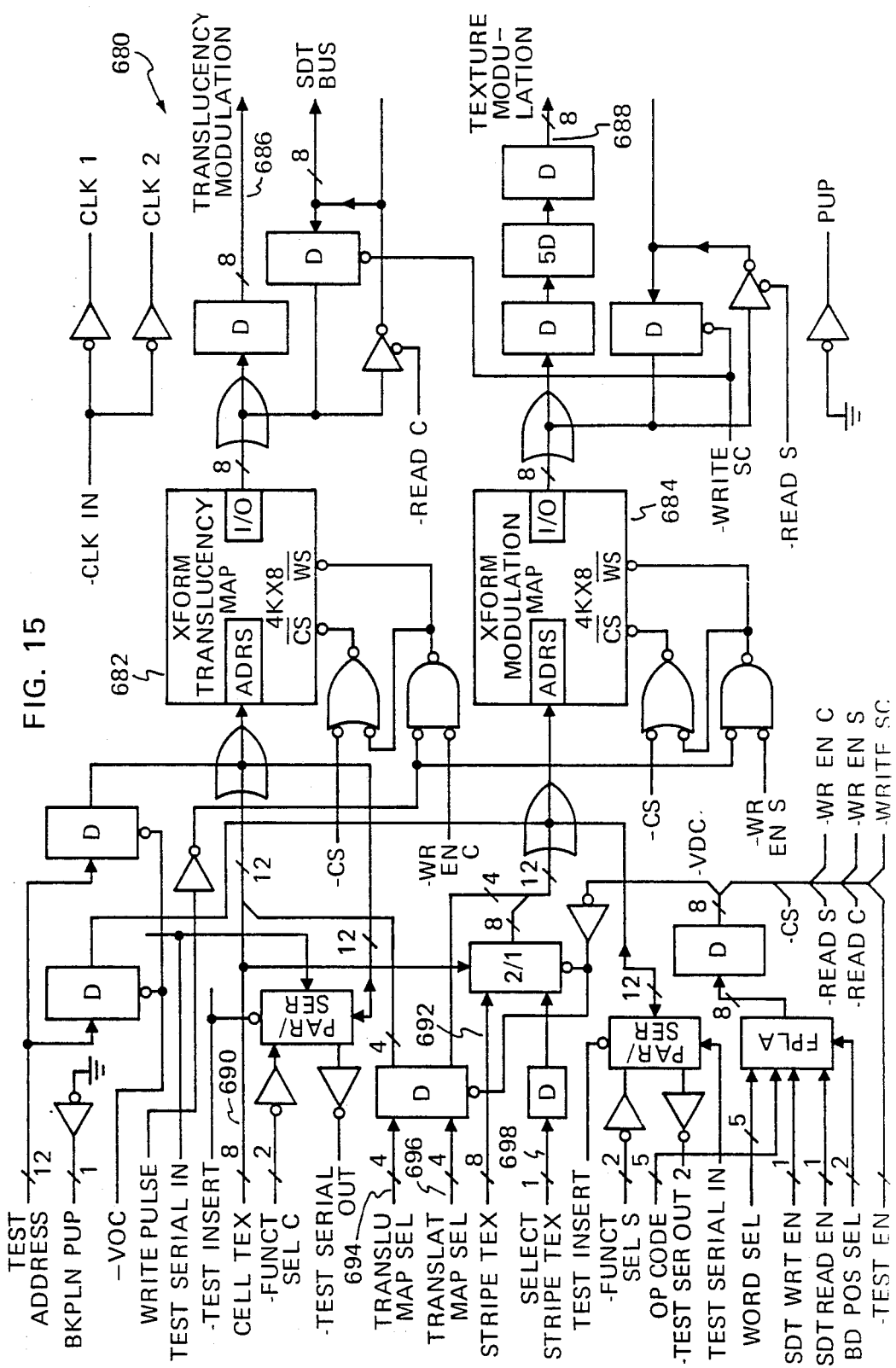
FIG. 15 is a schematic block diagram illustrating the translucency/modulation Transform calculation for the present invention.

The translucency/modulation transform cell/stripe select board 680 as shown in FIG. 15 is used to select between stripe texture or cell texture as the base modulation. Two transform maps 682, 684 are located on the board, one 682 for the translucency output 686 and one 684 for the texture modulation output 688. The board input modulation is connected to the address input to the maps, so that any desirable pattern transformation can be applied to the translucency and modulation separately. If a map has the current address stored at each memory location, then no transformation will take place. Any desired deviation can be applied starting from this basis. The translucency transform is used for programming the translucency threshold, slope and inverse selection where needed. The Cell Tex input 690 provides 8 input bits of cell modulation from the α blend board 630, and the Stripe Tex input 692 provides 8 input bits of stripe modulation from a conventional texture board. The translucency map select input 694 provides a 4-bit input code delayed from the input memory which selects one of 16 available translation maps for the face being processed. The translate map select input 696 provides a 4-bit input code delayed from the input memory which selects one of 16 available translation maps for the face being processed. The select stripe texture input 698 provides a control line input which also originates from the input memory, for controlling the selection of stripe texture. The translucency modulation is used to control the pixel by pixel face translucency of a CIG object.

Figure 16:
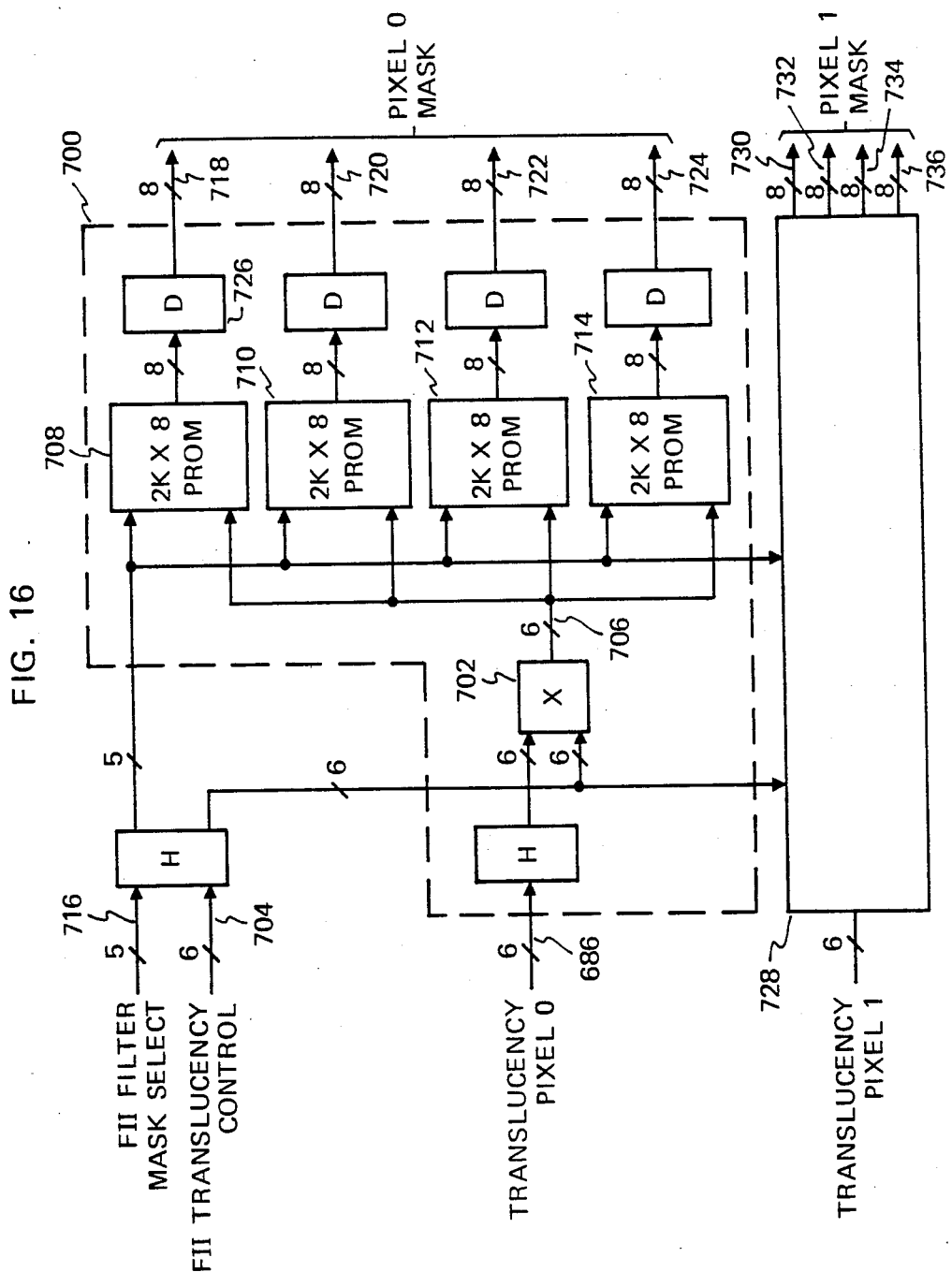
FIG. 16 is a schematic block diagram illustrating the cell texture translucency control function of the present invention.

The translucency output 686 is provided to the translucency multiply and mask look-up board 700 as shown in FIG. 16. Board 700 includes a multiplier PROM 702 which multiplies the 6-bit translucency multiplier 686 and a 6-bit control word 704 input from the Frame II memory 102. This multiplication yields a final pixel translucency percentage value 706 which is output to PROMs 708, 710, 712 and 714, which also receive a 5-bit control word 716 as inputs. PROMs 708, 710, 712 and 714 use the control word 716 to select the desired filter subpixel mask pattern. Each mask consists of a plurality of bits stored at successive addresses in the PROMs. Each mask pattern differs from its adjacent mask patterns in the PROM by one bit more or one bit less. The PROMs 708, 710, 712 ard 714 output 8-bit translucency mask values 718, 720, 722 and 724 via delay registers 726 used to maintain proper output synchronism with the span processor clock. The translucency mask values define the ratio of the combination of the colors of two faces according to Equation 7.

$$C = T * C_T + (1-T) * C_B \quad \text{Equation 7}$$

in which C is the observed color of the displayed pixel, T is the translucency of the face, $C_T$ is the translucent face color and $C_B$ is the color behind the translucent face. For example, in a system with 32 bit mask patterns, a face with 0/32 translucency is transparent, and therefore has no effect on the color of the displayed pixel, while a face with 32/32 translucency is an opaque face which totally defines the color of the displayed pixel. In this fashion the edge-on fading described above can be accomplished by supplying as the input 704 a fading factor dependent upon the viewing angle. A second translucency multiply and mask look-up board is employed to process inputs from the span processor, so that the two boards provide four pixel calculation paths as required by the span processor. The outputs 718, 720, 722, 724 and 730, 732, 734, 736 are provided to the span processor to control the pixel-by-pixel image displayed on the system video displays.

As will be appreciated by those skilled in the art, the present invention provides an advanced object generator capable of processing complex object images in real time with adequate detail to provide the visual cues necessary for advanced simulator training missions.

What is claimed is:

1. An advanced object generator comprising:

data memory means for storing cell-by-cell data for each of a plurality of faces of a plurality of three-dimensional objects, said cell data including data stored for each three-dimensional object on a plurality of planes, said planes being arranged in such a manner as to respectively present a plurality of viewing angles relative to a given view point;

vector processing means for calculating object transformations that translate operator inputs into image orientation control signals and for calculating pixel-by-pixel image data;

means for receiving image data from said vector processing means for selecting image data projected from selected ones of said plurality of planes for processing or video display;

edge-on fading factor processing means for calculating an edge-on fading factor for each face of said plurality of faces for each three-dimensional object to be displayed, each of said plurality of planes comprising a plurality of planes intersecting along a line within a respective object and said means for calculating an edge-on fading factor comprising:

means for calculating a viewing angle between a viewray extending from said given viewpoint to an object being displayed and the respective planes of the object being displayed, and translucency threshold calculation means for providing a multiplier for each respective plane of a three-dimensional object, said multiplier being indicative of the size of said respective viewing angle for each plane of each object to be displayed;

span processing means responsive to said edge-on fading factor processing means for calculating a fading factor percentage value based on the calculated edge-on fading factor for each face of said plurality of faces for each three-dimensional object of pixel-by-pixel display data;

video monitor means for displaying images of said objects comprising pixel-by-pixel displays of said display data; and wherein said translucency threshold calculation means comprises:

means for receiving viewing angle data for each respective face of an object from said means for calculating a viewing angle;

means for comparing each said respective viewing angle with a predetermined minimum angle and a predetermined maximum angle;

means for calculating a translucency coefficient for each said respective face when said viewing angle is between said minimum and said maximum viewing angles;

means for making each said respective face completely transparent when said viewing angle is less than said minimum viewing angle; and means for supplying said respective translucency coefficient to said span processing means.

2. The invention of claim 1 wherein said means for calculating a translucency coefficient comprises:

means for calculating a translucency coefficient when a respective one of said viewing angles is less than 36 degrees and greater than 18 degrees.

3. An advanced object generator comprising:

object data memory means for storing cell-by-cell data for a plurality of levels of detail of a plurality of a plurality of faces of a plurality of three-dimensional objects for retrieval and processing for video display of such objects;

vector processing means for translating operator inputs into image orientation control signals for calculating pixel-by-pixel display data;

first level of detail calculation means for calculating address data to retrieve from said object data memory means data for a first level of detail for each object image to be processed for video display, said first level of detail calculation means comprising:

means for calculating cell image size of each cell of a scene to be displayed;

means for comparing said cell image size to a previously calculated pixel dimension in order to determine which levels of detail to process;

means for accessing a first computer memory look-up table having previously determined level of detail data stored therein;

second level of detail calculation means for calculating address data to retrieve from said object data memory means data for a second level of detail for each object image to be processed for video display, said second level of detail calculation means comprising:

means for accessing a second computer memory look-up table having previously determined level of detail data stored therein;

means for outputting cell data previously stored in computer map memory means for each of said first and second levels of detail for each object to be displayed, level of detail blending means for combining the data for said first level of detail and the data for said second level of detail into a single level of detail output for each pixel of an image of an object, wherein said level of blending means comprises;

means for receiving as inputs gradients of image patterns upon each face image of a three-dimensional object;

means for receiving as inputs gradients of image patterns upon each face image of a three-dimensional object;

means for comparing said gradients with a predetermined maximum gradient for each of two dimensions;

means for comparing said gradients with predetermined values of said gradients to determine said higher level of detail;

means for calculating a level of detail blend control value;

means for calculating the one's complement of said level of detail blend control output;

means for multiplying said level of detail blend control value by said cell data for said first level of detail to generate a first product output;

means for multiplying said one's complement of said blend control value by said cell data for said second level of detail to generate a second product output;

summing means for adding the first product output to the second product output to produce a single modulation value output for each pixel of an image;

span processing means for translating said level of detail output into pixel-by-pixel display data; and video monitor means for displaying a plurality of images of objects comprising pixel-by-pixel displays of said display data.

4. The invention of claim 3 comprising:

a plurality of said level of detail blending means each providing a level of detail modulation value output for a plurality of pixels of said image.

5. An advanced object generator comprising:

data memory means for storing cell-by-cell object data for each of one or more faces of a plurality of objects for retrieval and processing for video display of such objects;

vector processing means for calculating object transformations that translate operator inputs into image orientation control signals and for calculating pixel-by-pixel image data;

cell texture address means for determining a memory location to be accessed for retrieval of cell texture data from said data memory means for display, said cell texture address comprising:

first and second floating point dual multiplying and summing means for calculating a first numerator and a second numerator needed for calculating object location coefficients for each object face to be displayed;

floating point dual summing and multiplying means for calculating a denominator common to both said coefficients;

means for calculating the reciprocal of said demoninator;

means for multiplying said denominator reciprocal by said first numerator and said second numerator and for adding to the resulting products reference values of said respective first and second numerators to obtain addresses on an object face corresponding to a span corner;

vertical interpolator means for calculating intermediate address parameters of image texture data of image elements disposed in one dimension between points located at addresses output by said floating point dual summing and multiplying means and for accessing texture data of predetermined columns of pixels on a span of said video display;

horizontal interpolator means for calculating intermediate address parameters of image texture data of image elements disposed in a second dimension on lines between points on first and second ones of said columns of pixels;

cell texture output means for outputting said cell texture data; and span processing means for translating said cell texture data into pixel-by-pixel displays of said display data, 6. The invention of claim 5 further comprising bilinear interpolation means comprising:

means for receiving a set of vertical and horizontal address pairs defining a span from said data memory means;

means for calculating an incrementing value;

incerementing means for incrementing a plurality of intermediate vertical addresses defining a plurality of pixel addresses separated vertically by said incrementing value along respective left and right hand columns of pixels defining respective edges of said span;

means for calculating horizontal addresses for respective rows of pixels located between respective pairs of vertically aligned pixels of said left and right hand columns to define a complete array of pixel addresses for said span; and output means for accessing a texture map memory at each pixel address of said array of pixel addresses.

7. The invention of claim 6 wherein said means for calculating an incrementing value comprises:

means for subtracting a vertical address of a first pixel at one end of a column of pixels from a vertical address of a second pixel at the other end of said column of pixels to obtain a vertical address difference; and means for dividing said vertical address difference by a predetermined constant equal to a number of desired vertical increments in said column.

8. The invention of claim 7 wherein said incrementing means comprises:

adder means for repetitively adding said incrementing value to a first vertical address and outputting a new vertical address after each successive addition until said first vertical address equals a second vertical address.

9. The invention of claim 8 wherein said means for calculating horizontal address values comprises:

first horizontal address summing means for adding two horizontal addresses input from said data memory means;

first divider means for dividing the sum of said horizontal addresses to yield a span horizontal midpoint address;

second horizontal summing means for adding a first horizontal address from said data memory means and said horizontal midpoint address;

second divider means for dividing the sum of said first horizontal address and said horizontal midpoint address to yield a one-fourth span horizontal address;

third horizontal summing means for adding a second horizontal address from said data memory means and said horizontal midpoint address; and third divider means for dividing the sum of said second horizontal address and said horizontal midpoint address to yield a three-fourths span horizontal address.

10. An advanced object generator for providing computer generated image control signals for real-time display comprising:

data memory means for storing cell-by-cell data for a plurality of levels of detail for a plurality of faces of a plurality of three-dimensional objects for retrieval and computer processing for video display of such objects; said cell data including data stored for each three-dimensional object on a plurality of planes; said planes being arranged in such manner as to respectively present a plurality of viewing angles to a given viewpoint;

vector processing means for calculating object transformations that translate operator inputs into image orientation control signals and for calculating valid pixel-by-pixel image data;

translucency code storage means for storing predetermined translucency factors for selected cells of the object faces;

translucency code processing means for calculating translucency factors on a pixel-by-pixel basis for said selected cells of an object;

means for receiving image data from said vector processing means for selecting image data projected from selected ones of said plurality of planes for processing for video display;

means for calculating an edge-on fading factor for each face of said plurality of faces for each three-dimensional object to be displayed;

first level of detail calculation means for calculating address data to retrieve from said object data memory means data for a first level of detail for each object image to be processed for video display;

second level of detail calculation means for calculating address data to retrieve from said object data memory means data for a second level of detail for each object image to be processed for video display;

level of detail blending means for combining the data for said first level of detail with the data for said second level of detail into a single level of detail output for each pixel of a video image of an object;

bilinear interpolation means for calculating pixel-by-pixel address data for each span to be processed;

cell texture address means for determining a memory location in said data memory means to be accessed for retrieval of cell texture data;

output means for outputting pixel-by-pixel image control data;

span processing means for receiving said pixel-by-pixel image control data and translating said image control data into pixel-by-pixel display data; and video monitor means for displaying a plurality of images of objects comprising pixel-by-pixel displays of said display data.

11. The invention of claim 10 wherein said translucency code processing means comprises:

means for selecting one translucency map, from a plurality of translucency maps stored in said data memory means, for each of the object faces to be processed for display upon said video monitor means; and means for multiplying a translucency code for each pixel in an object retrieved from said one translucency map by cell data for each pixel of said object.

12. The invention of claim 10 wherein each of said plurality of planes comprises a plurality of planes intersecting along a line within a respective object and said means for calculating an edge-on fading factor comprises:

means for calculating a viewing angle between a viewray extending from said given viewpiont to an object being displayed and the respective planes of the object being displayed; and translucency threshold calculation means for providing a multiplier for each respective plane of a three-dimensional object, said multiplier being indicative of the size of said respective viewing angle for each plane of each object to be displayed.

13. The invention of claim 12 wherein said translucency threshold calculation means comprises:

means for receiving viewing angle data for each respective face of an object from said means for calculating a viewing angle;

means for comparing each said respective viewing angle with a predetermined minimum angle and a predetermined maximum angle;

means for calculating a translucency coefficient for each said respective face when said viewing angle is between said minimum and said maximum viewing angles;

means for making each said respective face completely transparent when said viewing angle is less than said minimum viewing angle; and means for supplying said respective translucency coefficient to said span processing means.

14. The invention of claim 13 wherein said means for calculating a translucency coefficient comprises:

means for calculating a translucency coefficient when a respectively one of said viewing angles is less than 36 degrees and greater than 18 degrees.

15. The invention of claim 14 wherein each said plurality of planes comprises:

a plurality of planes intersecting along a line within a respective object.

16. The invention of claim 10 wherein said first level of detail calculation means comprises:

means for calculating cell image size of each cell of a scene to be displayed;

means for comparing said cell image size to a previously calculated pixel dimension in order to determine which levels of detail to process;

means for accessing a first computer memory lookup table having previously determined level of detail data stored therein; and wherein said second level of detail calculation means comprises:

means for accessing a second computer memory look-up table having previously determined level of detail data stored therein; and means for outputting cell data previously stored in computer map memory means for each of said first and second levels of detail for each object to be displayed.

17. The invention of claim 16 wherein said first level of detail comprises a higher level of detail than said second level of detail and said level of detail blending means comprises:

means for receiving as inputs gradients of image patterns upon each face image of a three-dimensional object;

means for comparing said gradients with a predetermined maximum gradient for each of two dimensions;

means for comparing said gradients with predetermined values of said gradients to determine said higher level of detail;

means for calculating a level of detail blend control value;

means for calculating the one's complement of said level of detail blend control output;

means for multiplying said level of detail blend control value by said cell data for said first level of detail to generate a first product output;

means for multiplying said one's complement of said blend control value by said cell data for said second level of detail to generate a second product output;

summing means for adding the first product output to the second product output to produce a single modulation value output for each pixel of an image.

18. The invention of claim 17 comprising:

a plurality of said level of detail blending means each providing a level of detail modulation value output for a plurality of pixels of said image.

19. The invention of claim 10 wherein said cell texture address means comprises:

first and second floating point dual multiplying and summing means for calculating a first numerator and a second numerator needed for calculating object location coefficients for each object face to be displayed;

floating point dual summing and multiplying means for calculating a denominator common to both said coefficients;

means for calculating the reciprocal of said denominator; and means for multiplying said denominator reciprocal by said first numerator and said second numerator and for adding to the resulting products reference values of said respective first and second numerators to obtain addrsses on an object face corresponding to a span corner;

vertical interpolator means for calculating intermediate address parameters of image texture data of image elements disposed in one dimension between points located at addresses output by said floating point dual summing and multiplying means and for accessing texture data of predetermined columns of pixels on a span of said video display; and horizontal interpolator meana for calculating intermediate address parameters of image texture data of image elements disposed in a second dimension on lines between points on first and second ones of said columns of pixels.

20. The invention of claim 19 wherein said bilinear interpolation means comprises:

means for receiving a set of vertical and horizontal address pairs defining a span from said data memory means;

means for calculating an incrementing value;

incrementing means for incrementing a plurality of intermediate vertical addresses defining a plurality of pixel addresses separated vertically by said incrementing value along respective left and right hand columns of pixels defining respective edges of said spans;

means for calculating horizontal addresses for respective rows of pixels located between respective pairs of vertically aligned pixels of said left and right hand columns to define a complete array of pixel addresses for said span; and output means for accessing a texture map memory at each pixel address of said array of pixel addresses.

21. The invention of claim 20 wherein said means for calculating an incrementing value comprises means for subtracting a vertical address of a first pixel at one end of a column of pixels from a vertical address of a second pixel at the other end of said column of pixels to obtain a vertical address difference; and means for dividing said vertical address difference by a predetermined constant equal to a number of desired vertical increments in said column.

22. The invention of claim 21 wherein said incrementing means comprises:

adder means for repetitively adding said incrementing value to a first vertical address and outputting a new vertical address after each successive addition until said first vertical address equals a second vertical address.

23. The invention of claim 22 wherein said means for calculating horizontal address values comprises:

first horizontal address summing means for adding two horizontal addresses input from said data memory means;

first divider means for dividing the sum of said horizontal addresses to yield a span horizontal midpoint address;

second horizontal summing means for adding a first horizontal address from said data memory means and said horizontal midpoint address;

second divider means for dividing the sum of said first horizontal address and said horizontal midpoint address to yield a one-fourth span horizontal address;

third horizontal summing means for adding a second horizontal address from said data memory means and said horizontal midpoint address; and third divider means for dividing the sum of said second horizontal address and said horizontal midpoint address to yield a three-fourths span horizontal address.

24. In a computer image generating system for generating an image of an object from stored data by color intensity control of a plurality of pixels forming the image of the object, the color intensity for each pixel being derived from a plurality of cells each having a predetermined color intensity value and a predetermined center position, and further a grouping of cells defining a texture pattern formed on a surface of the object, a method for determining color intensity for the plurality of pixels while obtaining smooth transitions between cell boundaries, the method comprising the steps of:

(a) defining a location of a pixel to be displayed;

(b) identifying the cells about a projection of the pixel whose centers define the corners of a polygon containing the center of the projection of the pixel;

(c) determining the location of the projection of the pixel center with respect to each cell identified in step (b);

(d) forming a weighted average value of color intensity for the pixel as a function of each cell color intensity value for cells identified in step (b) and the respective location determined in step (c); and (e) providing the weighted average value determined in step (d) for color intensity control of the pixel.

25. The method of claim 24 including the further steps of:

(f) storing a translucency value for each cell;

(g) determining a translucency mask having a predetermined number of subpixels for the pixel to be displayed; and (h) modifying the weighted average color intensity value in response to the translucency mask, wherein the modified weighted average color intensity value is supplied for color intenity control of the pixel.

26. The method of claim 24 and including the further steps of:

computing an apparent distance from a viewer to the object; and filtering the cell data to selectively reduce the level of detail of the object as the apparent distance increases.

27. The method of claim 26 and including the step of establishing a plurality of zones of apparent distances between the viewer and the object, the step of filtering occurring at each transition between zones.

28. The method of claim 24 and including the step of establishing from a single high level of detail image map of the object a plurality of level of detail image maps for a stored image of the object, each subsequent level of detail map being obtained by filering data representative of predetermined ones of the plurality of cells to obtain a filtered color intensity value for a single cell representative of the predetermined ones of the plurality of cells.

29. The method of claim 24 and including the steps of:
determining an apparent distance from a viewer to the object;
identifying two consecutive level of detail maps bracketing the determined apparent distance;
computing the weighted average value of color intensity for the pixel for each of the two consecutive level of detail maps; and
blending the two computed weighted average color intensity values to obtain a blended color intensity value, wherein the blended color intensity value is supplied for color intensity control of the pixel.

30. The method of claim 29 wherein said step of blending comprises the step of bilinearly interpolating the blended value in proportion to the relation apparent distance from each of the two level of detail maps.

31. The method of claim 24, wherein a stored image of the object to be displayed is defined by a face having cells defined by the stored data and including the steps of:
determining the angle of a view ray from a predetermined view-point to a plane of the face;
computing a translucency factor as a function of the determined angle; and
modifying the weighted average value in response to the translucency factor thereby gradually to fade out faces oriented edge-on to a viewer.

32. The method of claim 24 wherein the step of forming a weight average value comprises the step of bilinearly interpolating the respective color intensity value for each cell identified in step (b) in response to the respective distance from each cell center to the projection of the pixel center.

33. The method of claim 24 wherein the step of identifying cells comprises the step of identifying four adjacent cells whose centers define a polygon containing the center of the projection of the pixel.

* * * * *

UNITED STATES PATENT AND TRADEMARK OFFICE
CERTIFICATE OF CORRECTION

PATENT NO. : 4,727,365
DATED : FEBRUARY 23, 1988
INVENTOR(S) : WILLIAM M. BUNKER ET AL.

It is certified that error appears in the above-identified patent and that said Letters Patent is hereby corrected as shown below:

On the title page, item [56],
    References Cited, add to the list
the following reference:

"Texture and Reflection in Computer Generated Images", by James F. Blinn and Martin E. Newell, Communications of the ACM, October 1979, Volume 19, No. 10, Pages 542-547.

Signed and Sealed this

Twelfth Day of November, 1996

Attest:

BRUCE LEHMAN

*Attesting Officer*  *Commissioner of Patents and Trademarks*

US004727365B1

REEXAMINATION CERTIFICATE (3885th)

United States Patent [19]
Bunker et al.

[11] B1 4,727,365
[45] Certificate Issued Oct. 5, 1999

[54] ADVANCED VIDEO OBJECT GENERATOR

[75] Inventors: William M. Bunker, Ormond Beach; Jimmy E. Chandler, Holly Hill; Richard Economy, Ormond Beach; Richard G. Fadden, Jr., Daytona Beach; Michael P. Nelson, Ormond Beach, all of Fla.

[73] Assignee: Lockheed Martin Corporation, Bethesda, Md.

Reexamination Requests:
No. 90/004,010, Nov. 9, 1995
No. 90/004,273, Jun. 11, 1996
No. 90/004,883, Oct. 30, 1997

Reexamination Certificate for:
Patent No.: 4,727,365
Issued: Feb. 23, 1988
Appl. No.: 06/865,591
Filed: May 21, 1986

Certificate of Correction issued Sep. 20, 1988.

Certificate of Correction issued Nov. 12, 1996.

Related U.S. Application Data

[63] Continuation of application No. 06/527,809, Aug. 30, 1983, abandoned.

[51] Int. Cl.⁶ ...................................................... G09G 5/36
[52] U.S. Cl. .......................................... 345/139; 345/430
[58] Field of Search ................................... 345/121, 127, 345/133–139, 419–441, 473–475

[56] References Cited

U.S. PATENT DOCUMENTS

| | | |
|---|---|---|
| 3,418,459 | 12/1968 | Purdy et al. . |
| 3,441,789 | 4/1969 | Harrison, III . |
| 3,454,822 | 7/1969 | Harrison, III . |
| 3,527,980 | 9/1970 | Robichaud et al. . |
| 3,585,628 | 6/1971 | Harrison, III . |
| 3,602,702 | 8/1971 | Warnock . |
| 3,621,214 | 11/1971 | Romney et al. . |
| 3,665,408 | 5/1972 | Erdahl et al. . |
| 3,736,564 | 5/1973 | Watkins . |
| 3,747,087 | 7/1973 | Harrison, III et al. . |
| 3,769,442 | 10/1973 | Heartz et al. . |
| 3,786,478 | 1/1974 | King, Jr. . |
| 3,792,463 | 2/1974 | Eriksson et al. . |

(List continued on next page.)

FOREIGN PATENT DOCUMENTS

| | | |
|---|---|---|
| 55-158771 | 12/1980 | Japan . |
| 56-090375 | 7/1981 | Japan . |
| 58-004176 | 1/1983 | Japan . |
| 58-027192 | 2/1983 | Japan . |
| 58-049983 | 3/1983 | Japan . |
| 2051525 | 1/1981 | United Kingdom . |
| 2113887 | 8/1983 | United Kingdom . |

OTHER PUBLICATIONS

Instruction Manual for Visual Three–View Space Flight Simulator, Part One—Volume A, Operating and Maintenance Instructions for General Electric Computed Space Flight Display System, Contract No. NAS9–1375 prepared for National Aeronautics & Space Administration, Manned Spacecraft Center, Houston Texas.

Schachter, Bruce J., "Computer Image Generation for Flight Simulation," Computer Graphics, vol. 1, No. 4, Oct. 1981, pp. 29–68.

Schmacker, R., "A New Visual System Architecture," Proceedings of the Second Interservice/Industry Training Equipment conference, Nov. 18–20, 1980, pp. 94–101.

*Primary Examiner*—Xiao M. Wu

[57] ABSTRACT

A computer video image generating system including a computer memory having three dimensional object data stored therein employs an advanced object generator for retrieving and processing the object data for output to a span processor for controlling the pixel-by-pixel video output signal for a video display. The advanced object generator includes a translucency processor, an edge-on fading processor, a level of detail blending processor and a bilinear interpolator for texture smoothing.

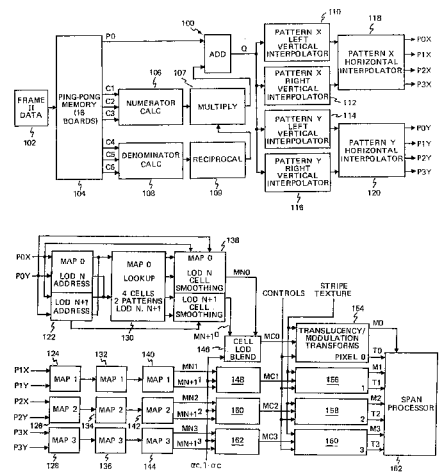

U.S. PATENT DOCUMENTS

| | | |
|---|---|---|
| 3,816,726 | 6/1974 | Sutherland et al. . |
| 3,889,107 | 6/1975 | Sutherland . |
| 3,969,716 | 7/1976 | Roberts . |
| 3,996,673 | 12/1976 | Vorst et al. . |
| 3,999,308 | 12/1976 | Peters . |
| 4,017,985 | 4/1977 | Heartz . |
| 4,038,668 | 7/1977 | Quarton . |
| 4,053,740 | 10/1977 | Rosenthal . |
| 4,074,281 | 2/1978 | Quarton . |
| 4,077,062 | 2/1978 | Nielsen . |
| 4,119,954 | 10/1978 | Seitz et al. . |
| 4,119,956 | 10/1978 | Murray . |
| 4,127,850 | 11/1978 | Vallins . |
| 4,129,860 | 12/1978 | Yonezawa et al. . |
| 4,179,823 | 12/1979 | Sullivan et al. . |
| 4,179,824 | 12/1979 | Marsh . |
| 4,189,743 | 2/1980 | Schure et al. . |
| 4,193,092 | 3/1980 | Stoffel . |
| 4,208,719 | 6/1980 | Lotz et al. . |
| 4,208,810 | 6/1980 | Rohner et al. . |
| 4,213,252 | 7/1980 | Sullivan et al. . |
| 4,215,414 | 7/1980 | Huelsman . |
| 4,225,861 | 9/1980 | Langdon, Jr. et al. . |
| 4,237,457 | 12/1980 | Houldsworth . |
| 4,262,290 | 4/1981 | Vallins . |
| 4,263,593 | 4/1981 | Dagostino et al. . |
| 4,263,726 | 4/1981 | Bolton . |
| 4,297,691 | 10/1981 | Kodama et al. . |
| 4,324,401 | 4/1982 | Stubben et al. . |
| 4,343,037 | 8/1982 | Bolton . |
| 4,348,184 | 9/1982 | Moore . |
| 4,352,105 | 9/1982 | Harney . |
| 4,360,883 | 11/1982 | Ejiri et al. . |
| 4,384,338 | 5/1983 | Bennett . |
| 4,396,989 | 8/1983 | Fleming et al. . |
| 4,404,553 | 9/1983 | Cuffia . |
| 4,432,009 | 2/1984 | Reitmeier et al. . |
| 4,437,122 | 3/1984 | Walsh et al. . |
| 4,446,529 | 5/1984 | Strolle . |
| 4,454,593 | 6/1984 | Fleming et al. . |
| 4,463,380 | 7/1984 | Hooks, Jr. . |
| 4,471,349 | 9/1984 | Strolle . |
| 4,475,104 | 10/1984 | Shen . |
| 4,484,188 | 11/1984 | Ott . |
| 4,486,785 | 12/1984 | Lasher et al. . |
| 4,489,389 | 12/1984 | Beckwith et al. . |
| 4,498,080 | 2/1985 | Culver . |
| 4,528,642 | 7/1985 | Waller . |
| 4,532,503 | 7/1985 | Pennebaker . |
| 4,543,645 | 9/1985 | Vigarie . |
| 4,544,922 | 10/1985 | Watanabe et al. . |
| 4,549,275 | 10/1985 | Sukonick . |
| 4,570,233 | 2/1986 | Yan et al. . |
| 4,580,782 | 4/1986 | Ochi . |
| 4,584,572 | 4/1986 | Lambert, III . |
| 4,586,037 | 4/1986 | Rosener et al. . |
| 4,600,919 | 7/1986 | Stern . |
| 4,609,917 | 9/1986 | Shen . |
| 4,610,026 | 9/1986 | Tabata et al. . |
| 4,614,941 | 9/1986 | Jarvis . |
| 4,615,013 | 9/1986 | Yan et al. . |
| 4,645,459 | 2/1987 | Graf et al. . |
| 4,656,467 | 4/1987 | Strolle . |
| 4,677,576 | 6/1987 | Berlin, Jr. et al. . |
| 4,680,720 | 7/1987 | Yoshii et al. . |

OTHER PUBLICATIONS

Schumacker et al., "Study for Applying Computer–Generated Images to Visual Simulation," Air Force Human Resources Laboratory Report No. AFHRL–TR–69–14, Sep. 1969.

Smith, Alvy Ray, "Texas (Preliminary Report)", Computer Graphics Lab, New York Institute of Techn ology, Technical Memo No. 10, Jul. 27, 1979, pp. 1–13.

Smith, Alvy Ray, Special Effects for Star Trek II: The Genesis Demo, Instant Evolution with Computer Graphics, American Cinematographer, Oct. 1982, pp. 1038–1039, 1048–1050.

Smith, Alvy Ray, "Digital Filmmaking" Abacus vol. 1, No. 1, 1983.

Aoki, M. and Levine, M. Computer Generation of Realistic Pictures,: Comput. & Graphics, vol. 3, 1978, pp. 149–161.

Cosman, M. and Schumacker, R. "System Strategies to Optimize CIG Image Content,"II Conference, Jun. 1981.

Devich, R. and Weinhaus, F., "Image Perspective Transformations," Proceedings of the Society of Photo–Optical Instrumentation Engineers, vol. 238, Image Processing for Missle Guideance, Jul. 29–Aug. 1, 1980, pp. 322–332.

Pratt, William K., Digital Image Processing, John Wiley & Sons, Inc. 1978, pp. 113–116.

Williams, Lance, SIGGRAPH 1981 Seminar: Advanced Image Synthesis, Lecture handout, Use of Texture and Reflectance Maps, Aug. 3, 1981.

Castleman, Kenneth R., *Digital Image Processing,* Prentice–Hall Publishing Co., 1979, Chapters 8 (pp. 110–135) and 17 (pp. 347–379).

Feibush, Eliot A., "An Interactive Computer Aided System for Synthesizing Texture Renderings of Architectural Designs," A Thesis Presented to the Faculty of the Architectural School of Cornell University, Jun. 1979, pp. 1–37 and A1–A7.

Kay, Douglas S., and Greenberg, Donald P., "Transparency for Computer Synthesize Images," Computer Graphics, vol. 13, No. 2, 1979, pp. 158–164.

Levoy Levoy, Marc, "Compupter–Assisted Cartoon Animation," A Thesis Presented the Faculty of the Graduate School of Cornell University, Aug. 1978, pp. 1–104.

Wallace, Bruce A., "Merging and Transformation of Raster Images for Cartoon Animation," Computer Graphics, vol. 15, No. 3, Aug. 1981, pp. 253–262.

Blinn, James F., "Computer Display of Curved Surfaces," Thesis, Dept. of Comptr. Sci., University of Utah, Salt Lake City, Fall, 1978.

Blinn, James F., "Simulation of Wrinkled Surfaces," Proceedings from the 5th Conference Computer Graphics and Interactive Techniques, Atlanta, Georgia, 1978. 286–292.

Feibush, Eliot; Levoy, Marc; and Cook, Robert L., "Synthetic Texturing Using Digit Filters," Proceedings of SIGGRAPH '80, Seattle, Washington, Jul. 14–18, 1980, pp. 294–301.

Perny, Didier; Gangnet, Michel; and Coueignoux, Philippe, "Perspective Mapping of Planar Textures," Computer Graphics, vol. 16, No. 1, May, 1982, pp. 70–100.

Williams, Lance, "Pyramidal Parametrics," Computer Graphics, vol. 17, No. 3, Jul. 1983, pp. 1–11.

Atherton et al., "Polygon Shadow Generation," Computer Graphics, vol. 12, Aug. 1978.

Batson et al., "Computer–Generated Shaded–Relief Images," Jour. Research U.S. Geol. Survey, vol. 3, No. 4, Jul.–Aug. 1975, pp. 401–408.

Blinn, "the Internal Design of the IG Routines, an Interactive Graphics System for a Large Timesharing Environment," Jul. 1976, pp. 229–234.
Blinn, "Models of Light Reflection for Computer Synthesized Pictures," Proceedings of ACM (Siggraph) 1977), pp. 192–198.
Blinn, "Realism in Computer Graphics," WESCON Technical Papers, Los Angeles, Sep. 1978, p. 3.
Blinn, "Image Processing: The Future Vital Link," Computer Graphics, Infotech, Maidenhead, U.K., 1980.
Blinn, "A Generalization of Algebraic Surface Drawing," ACM Transactions on Graphics, vol. 1,k No. 3, Jul. 1982, pp. 235–256.
Blinn et al., "Clipping Using Homogeneous Coordinates," Computer Graphics (Siggraph ACM), vol. 12, No. 3, 1978, pp. 245–251.
Blinn, "A Scan Line Algorithm for Displaying Parametrically Defined Surfaces," (Siggraph 1978).
Catmull, "A Hidden–Surface Algorithm with Anti–Aliasing," New York Institute of Technology, NY (1978).
Catmull et al., "3–D Transformations of Images in Scanline Order," Computer Graphics (Siggraph '80), vol. 14, Jul. 1980.
Dungan, Jr. et al., "Texture Tile Considerations for Raster Graphics," Computer Graphics (Siggraph '78 Proc.), vol. 12, No. 3, Aug. 12, 1978.
Fu et al., "Computer Generation of Texture Using a Syntactic Approach," Siggraph '78, Aug. 21–25.
Gagalowicz et al., "Synthesis of Natural Textures on 30D Surfaces," Technical Report AFOSR–TR–84–0176, Nov. 1983.
Gouraud, "Computer Display of Curved Surfaces," Dept. of Computer Science, University of Utah, UTEC–71–113, Jun. 1971.
Lane et al., "Scan Line Methods for Displaying Parametrically Defined Surfaces," Comm. of the ACM, vol. 23, No. 1, Jan. 1980, pp. 23–24.
Newell et al., "A Solution to the Hidden Surface Problem," Proceedings of ACM, 1972, pp. 443–450.
Norton et al., "Clamping: A Method of Antialiasing Textured Surfaces by Bandwidth Limiting in Object Space," Computer Graphics, vol. 16, No. 3, Jul. 1982, pp. 1–8.
Schweitzer, "Artificial Texturing: An Aid to Surface Visualization," Computer Graphics, vol. 17, No. 3, Jul. 1993.
Soland et al., "Real–Time Feasibility for Generation of Nonlinear Textured Terrain," Technical Report AFHRL–TR–79–27, Jan. 1981.
Sorensen, "Tronic Imagery," BYTE Publications, Nov. 1982, pp. 49–74.
Stenger et al., "Computer Image Generation Texture Study," Technical Report AFHRL–TR–79–2, Aug. 1979.
Sutherland et al., "A Characterization of Ten Hidden–Surface Algorithms," Computing Surveys, vol. 6, No. 1, Mar. 1974, pp. 1–55.
Warnock, "A Hidden Surface Algorithm for Computer Generated Halftone Pictures," Dept. of Computer Science, University of Utah, Report TR–4–15; RADC–TR–69–249, Jun. 1969, p. 33.
Watkins, "A Real Time Visible Surface Algorithm," Dept. of Computer Science, University of Utah, UTEC–70–101, Jun. 1970.
Whitted, "An Improved Illumination of Model for Shaded Display," Comm. of the ACM, vol. 23, No. 6, Jun. 1980, pp. 343–349.
Whitted, "A Scan Line Algorithm for Computer Display of Curved Surfaces," Proc. of 5th Conference on Computer Graphics and Interactive Techniques (1978).
Butt et al., "Studies in Visual Texture Manipulation and Synthesis," Computer Science Center Univresity of Maryland, Technical Report 68–64, May 1968.
Bunker et al., "Perspective Display Simulation of Terrain," Technical Report AFHRL–TR–76–39 (Jun. 1976).
Coleman, Jr. et al., "Obtaining 3–Dimensional Shape of Textured and Specular Surfaces Using Four–Source Photometry," Computer Graphics and Image Processing, vol. 18 (1982).
McNary et al., "Segmentation–Based Boundary Modeling for Natural Terrain Scenes," SPIE, vol. 205, Image Understanding Systems II (1979).
Sun et al., "Neighboring Gray Level Dependence Matrix for Texture Classification," Computer Vision, Graphics, and Image Processing, vol. 23 (1983).
Tsutsumi, et al., "Texture Classification Realized by Use of Bilinear Spatial Filter," Seventeenth International Symposium on Remote Sensing of Environment, May 9–13, 1983.
Zucker, "Toward a Model of Texture," Computer Graphics and Image Processing, vol. 5 (1976).
"Artistry in Layers: Generating Color Transparencies," Denbrook Computer Design, Jul. 1982, pp. 155–163.
Bunker et al., "Computer Image Generation Imagery Improvement: Circles, Contours, and Texture," Air Force Technical Report AFHRL–TR–77–66, Sep. 1977, pp. 117–129.
Graf et al., "Computer Generated/Synthesized Imagery (CGIS)," vol. I, Proceedings of the Fourth Interservice/Industry Training Equipment Conference, Nov. 16–18, 1982, pp. 549–558.
Skolmoski, "Texture in a Low Cost Visual System," vol. I, Proceedings of the Fourth Interservice/Industry Training Equipment Conference, Nov. 16–18, 1982, pp. 541–548.
Andrews et al., "Digital Interpolation of Discrete Images," IEEE Trans. on Computers, vol. C–25, No. 2, Feb. 1976.
Blinn (1), "Computer Display of Curved Surfaces," Thesis, Dept. of Comptr. Sci., University of Utah, Salt Lake City, Fall 1978.
Blinn (2), "Simulation of Wrinkled Surfaces," Proceedings from the 5th Conference Computer Graphics and Interactive Techniques, Atlanta, Georgia, 1978, pp. 286–292.
Blinn (3), "Light Reflection Functions for Simulation of Clouds and Dusty Surfaces," Computer Graphics, vol. 16, No. 3 (Jul. 1982), pp. 21–29.
Blinn et al., "Texture and Reflection in Computer Generated Images," Comm. of the Association for Computing Machinery, vol. 19, No. 10 (Oct. 1976), pp. 542–547.
Catmull et al., "Computer Display of Curved Surfaces," Proc. IEEE Conf. on Computer Graphics, Pattern Recognition and Data Structure, May 1975, pp. 11–17.
Crow, "The Aliasing Problem in Computer–Synthesized Shaded Images," Dept. of Computer Science, University of Utah, Mar. 1976.
Feibush et al. (1), "Texture Rendering for Architectural Design," Computer and Design, vol. 12, No. 2, Mar. 1980.
Feibush et al. (2), "Synthetic Texturing Using Digital Filters," Proceedings of SIGGRAPH '80, Seattle, Washington, Jul. 14–18, 1980, pp. 294–301.
Gangnet et al., "Perspective Mapping of Planar Textures," Eurographics '82, North–Holland Publishing Co., Sep. 1982, pp. 57–71.

Gardner, "Simplified Scene Modelling Using Curved Surfaces and Texturing," vol. I, Proceedings of the Fourth Interservice/Industry Training Equipment Conference, Nov. 16–18, 1982, pp. 23–29.

Gouraud, "Continuous Shading of Curved Surfaces," IEEE Transactions on Computers, vol. C–20, No. 6, Jun. 1971, pp. 623–629.

Mayer et al., "Enhancing the Computer Generated Illusion," vol. I, Proceedings of the Fourth Interservice/Industry Training Equipment Conference, Nov. 16–18, 1982, pp. 13–22.

Newell et al., "The Progression of Realism in Computer Generated Images," Proceedings of ACM National Conf. (1977), pp. 444–448.

Oppenheim et al., "Digital Signal Processing," Prentice–Hall, Englewood Cliffs, NJ, 1975, pp. 26–34.

Perny et al., "Perspective Mapping of Planar Textures," Computer Graphics, vol. 16, No. 1, May 1982, pp. 70–100.

Phong et al., "Illumination for Computer Generated Pictures," Comm. of the ACM, vol. 18, No. 6, Jun. 1975, pp. 311–317.

Williams et al., "Pyramidal Parametrics," Computer Graphics, vol. 17, No. 3, Jul. 1983, pp. 1–11.

Bunker, "Visual Scene Simulation with Computer Generated Images," 5th Annual Simulation Symposium, Mar. 8–10, 1972, pp. 91–114.

Bunker, "Real–Time, Three–Dimensional, Visual Scene Generation with Computer Generated Images," Proceedings of the 1973 Summer Computation Simulation Conference, Jul. 13–19, 1973, pp. 205–212.

Bunker, "Applied Optical Illusions—A Simulation Model of Eye Response Helps Improve Visual Scene Simulation," 8th Annual Simulation Symposium, Mar. 12–15, 1975, pp. 181–195.

Bunker, "Computer Generation of Images. The Multi–Purpose Tool," SPIE, vol. 59, (1975) Simulators & Simulation, pp. 25–39.

Bunker et al., "Computer Image Generation: Improved Edge Utilization Study," Technical Report AFHRL–TR–78–81, Feb. 1979.

Bunker et al., "Circles, Texture, Etc. Alternate Approaches to CIG Scene Detail," Technical Report AIAA 78–1578, 1978, pp. 49–58.

Whitted, "Anti–Aliased Drawing Using Brush Extrusion," Computer Graphics, vol. 17, No. 3, Jul. 1983, pp. 151–156.

Rubin et al., "A 3–Dimensional Representation for Fast Rendering of Complex Scenes," Computer Graphics, vol. 14, No. 3, Jul. 14–18, 1980, pp. 110–116.

Bunker, "Filtering Simulated Visual Scenes—Spatial and Temporal Effects," Proceedings of the 4th Interservice/Industry Training Equipment Conference, Nov. 16–18, 1982, vol. I, AD–A122 155.

Whitted, "Processing Requirements for Hidden Surface Elimination and Realistic Shading," Digest of Papers Spring COMPCON 82, IEEE, Feb. 22–25, 1982.

Whitted, "A Software Test–Bed for the Development of 3–D Raster Graphics Systems," Computer Graphics, vol. 15, No. 3, Aug. 1981, pp. 271–277.

Whitted, A Software Testbed for the Development of 3D Raster Graphics Systems, ACM Transactions on Graphics, vol. 1, No. 1, Jan. 1982, pp. 43–58.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–23 is confirmed.

Claims 24, 25 and 30 are determined to be patentable as amended.

Claims 26–29 and 31–33, dependent on an amended claim, are determined to be patentable.

24. In a computer image generating system for generating an image of an object *in real-time* from stored data by color intensity control of a plurality of pixels forming the image of the object, the color intensity for each pixel being derived from a plurality of cells each having a predetermined color intensity value and a predetermined center position, and further a grouping of cells defining a texture pattern formed on a surface of the object, a method for determining color intensity for the plurality of pixels while obtaining smooth transitions between cell boundaries, the method comprising the steps of:

(a) defining a location of a pixel to be displayed;

(b) identifying the cells about a projection of the pixel whose centers define the corners of a polygon containing the center of the projection of the pixel;

(c) determining the location of the projection of the pixel center with respect to each cell identified in step (b);

(d) forming a weighted average value of color intensity for the pixel as a function of each cell color intensity value for cells identified in step (b) and the respective location determined in step (c); and (e) providing the weighted average value determined in step (d) for color intensity control of the pixel.

25. The method of claim 24, including the further steps of:

(f) storing a translucency value for each cell;

(g) [determining] *using a plurality of the translucency values to determine* a translucency mask, *wherein the translucency mask* [having] *consists of* a predetermined number of bits, each *of said bits representing a respective one of a* number of subpixels for the pixel to be displayed; and (h) modifying the weighted average color intensity value in response to the translucency mask, wherein the modified weighted average color intensity value is supplied for color [intenity] *intensity* control of the pixel.

30. The method of claim 29 wherein said step of blending comprises the step of [bilinearly] *linearly* interpolating the [blended value] *two computed weighted average color intensity values* in proportion to the relative apparent distance from each of the two level of detail maps.

* * * * *